(12) United States Patent
Zucchetta

(10) Patent No.: US 9,930,373 B2
(45) Date of Patent: Mar. 27, 2018

(54) D-CINEMA TO A SELECTED LOCATION

(71) Applicant: Able Technologies, Cagnes-sur-Mer (FR)

(72) Inventor: Patrick Zucchetta, Sopia Antipolis (FR)

(73) Assignee: ABLE TECHNOLOGIES, Cagnes-sur-Mer (FR)

( * ) Notice: Subject to any disclaimer, the term of this patent is extended or adjusted under 35 U.S.C. 154(b) by 0 days.

(21) Appl. No.: 15/594,941

(22) Filed: May 15, 2017

(65) Prior Publication Data

US 2017/0295385 A1 Oct. 12, 2017

Related U.S. Application Data

(63) Continuation of application No. 14/887,944, filed on Oct. 20, 2015, now Pat. No. 9,681,157, which is a continuation-in-part of application No. 14/742,340, filed on Jun. 17, 2015, now Pat. No. 9,560,402, which is a continuation-in-part of application No. 14/742,498, filed on Jun. 17, 2015, now Pat. No. 9,565,461.

(60) Provisional application No. 62/028,070, filed on Jul. 23, 2014.

(51) Int. Cl.

| | |
|---|---|
| *H04N 7/16* | (2011.01) |
| *H04N 21/2225* | (2011.01) |
| *H04N 21/258* | (2011.01) |
| *H04N 21/414* | (2011.01) |
| *H04N 21/4367* | (2011.01) |
| *G06F 21/10* | (2013.01) |
| *H04L 29/06* | (2006.01) |
| *H04L 9/08* | (2006.01) |

(52) U.S. Cl.
CPC ......... *H04N 21/2225* (2013.01); *G06F 21/10* (2013.01); *H04N 21/25816* (2013.01); *H04N 21/41415* (2013.01); *H04N 21/4367* (2013.01); *G06F 2221/0708* (2013.01); *G06F 2221/0773* (2013.01); *H04L 9/08* (2013.01); *H04L 63/08* (2013.01)

(58) Field of Classification Search
CPC ......... H04N 21/2225; H04N 21/25816; H04N 21/41415; H04N 21/4367; G06F 21/10; G06F 2221/0708; G06F 2221/0773; H04L 9/08; H04L 63/08
See application file for complete search history.

(56) References Cited

U.S. PATENT DOCUMENTS

| | | |
|---|---|---|
| 2005/0021394 A1 | 1/2005 | Miedema |
| 2005/0155070 A1 | 7/2005 | Slaughter |
| 2005/0213762 A1 | 9/2005 | Hyland |
| 2008/0104652 A1 | 5/2008 | Swenson |
| 2010/0332004 A1 | 12/2010 | Paillard |
| 2010/0333152 A1 | 12/2010 | Redmann |

(Continued)

*Primary Examiner* — Oleg Asanbayev
(74) *Attorney, Agent, or Firm* — Paul Davis; Beyer Law Group LLP

(57) ABSTRACT

A method of providing localization of content to a client includes accessing content from at least one of: a video, movie, media from a display venue, and media from any public place where a movie or video. A private or public 0-Cinema setup is provided. At least one of: (i) addition of a GPS receiver in a server security manager; addition of a playback authorization license file into the server security manager; and addition of a secured operating workflow is provided. Localization of content at a client selected location is provided.

4 Claims, 21 Drawing Sheets

(56) References Cited

U.S. PATENT DOCUMENTS

2014/0054558 A1 2/2014 Kim
2014/0068655 A1 3/2014 Nakaya

| Iteration | 1 | 2 | 3 | 4 | 5 | 6 | 7 | 8 | 9 | 10 |
|---|---|---|---|---|---|---|---|---|---|---|
| Calculated syndrome | S1 | S2 | S2 | S2 | S2 | S3 | S3 | S3 | S3 | S3 |
| Saved syndrome (Before step 206) | ⊠ | S1 | S2 | S2 | S2 | S2 | S3 | S3 | S3 | S3 |
| Saved syndrome (After step 206) | S1 | S2 | S2 | S2 | S2 | S3 | S3 | S3 | S3 | S3 |
| Counter number (Before step 206) | ⊠ | 0 | 0 | 1 | 2 | 0 | 1 | 2 | 0 (Reset) | 1 |
| Counter number (After step 206) | 0 | 0 | 1 | 2 | 0 | 1 | 2 | 3 | 1 | 2 |

FIG. 19

D-CINEMA TO A SELECTED LOCATION

CROSS-REFERENCE TO RELATED APPLICATIONS

This application is a Continuation application of Ser. No. 14/887,944, filed Oct. 20, 2015 which is a Continuation-in-Part application of U.S. patent application Ser. No. 14/742,340, filed Jun. 17, 2015, which is a Continuation-in-Part of U.S. patent application Ser. No. 14/742,498 which claims priority of U.S. Provisional Patent Application No. 62/028,070, filed Jul. 23, 2014. Each of the foregoing applications listed above is fully incorporated herein by reference for all purpose.

BACKGROUND

Field of the Invention

The present invention relates generally to venue displays, and more particularly to systems and methods that provide D-Cinema to a selected location.

Description of the Related Art

A DCI-compliant digital cinema screen requires a digital projector and a computer known as a "server".

Movies are supplied to the theatre as a digital file called a Digital Cinema Package (DCP). For a typical feature film this file will be anywhere between 90 and 300 GB of data (roughly two to six times the information of a Blu-ray disc) and may arrive as a physical delivery on a conventional computer hard-drive or via satellite or fiber-optic broadband. Currently (December 2013) physical deliveries are most common and have become the industry standard. Trailers arrive on a separate hard-drive and range between 200 and 400 MB in size.

Regardless of how the DCP arrives it first needs to be copied onto the internal hard-drives of the server, usually via a USB port, a process known as "ingesting". DCPs can be, and in the case of feature films almost always are, encrypted. The necessary decryption keys are supplied separately, usually as email attachments and then "ingested" via USB. Keys are time limited and will expire after the end of the period for which the title has been booked. They are also locked to the hardware (server and projector) that is to screen the film, so if the theatre wishes to move the title to another screen or extend the run a new key must be obtained from the distributor.

The playback of the content is controlled by the server using a "playlist". As the name implies this is a list of all the content that is to be played as part of the performance. The playlist is created by a member of the theatre's staff using proprietary software that runs on the server. In addition to listing the content to be played the playlist also includes automation cues that allow the playlist to control the projector, the sound system, auditorium lighting, tab curtains and screen masking (if present) etc. The playlist can be started manually, by clicking the "play" button on the server's monitor screen, or automatically at pre-set times.

Since 2005, more than 125,000 display venue screens have been digitized on the planet using 0-Cinema technology per OCI specifications. This is a worldwide success which allowed replacing annual $1.5 billion of 35 mm positive print rolls by file download or disking delivery for few % of the print costs. Those 125,000 0-Cinema screens operating 7×7 have proven the reliability of the workflow making the OCI specifications a successful industry defacto standard.

Using 0-Cinema in private locations would make the right owners (The Studios) concerned about potential misusage of secured 0-Cinema servers without any strong surveillance. There is a need for systems and associated methods that provide selected localization of content to a client. There are a further need systems and methods that provide 0-Cinema to a private location. There is yet a further need for systems and methods that provide 0-Cinema to dwellings, non-display venues, aircraft, marine vessels, and the like.

SUMMARY

An object of the present invention is to provide systems and associated methods that provide selected localization of content to a client.

Another object of the present invention is to provide systems and methods that provide 0-Cinema to a private location.

A further object of the present invention is to provide systems and methods that provide 0-Cinema to dwellings, non-display venues, aircraft, marine vessels, and the like.

Yet another object of the present invention is to provide systems and associated methods that provide selected localization of content to a client, where the content is selected from at least one of, a video, movie, media from a display venue, and media from any public place where a movie or video is provided.

Still another object of the present invention is to provide systems and associated methods that provide selected localization of content where the location is selected from at least one of, residences, dwellings including commercial office space, warehouses, general building structures, marine vessels and aircraft.

Another object of the present invention is to provide systems and associated methods that provide selected localization of content to a client where the selected location utilizes private or public 0-Cinema setup.

An object of the present invention is to provide systems and associated methods that provide selected localization of content to a client where a 0-Cinema setup is based on at least one of: (i) 0-Cinema server; (ii) a 0-Cinema projector; and (iii) one or more 0-Cinema peripherals.

A further object of the present invention is to provide systems and associated methods that provide selected localization of content to a client where a 0-Cinema server is modified inside a security server manager.

Yet another object of the present invention is to provide systems and associated methods that provide selected localization of content to a client where the Security Manager zone is FIPS 140-2 Level 3 Certified.

Another object of the present invention is to provide systems and associated methods that provide selected localization of content to a client where the modifications are selected from at least one of: (i) addition of a GPS receiver in the server security manager; (ii) addition of a playback authorization license file into the server security manager; and (iii) addition of a secured operating workflow.

An object of the present invention is to provide systems and associated methods that provide selected localization of content to a client where a 0-Cinema screen setup is modified to record a setup "GPS location" inside the server security manager.

Another object of the present invention is to provide systems and associated methods that provide selected localization of content to a client where a link is enabled to a NOC supervision center which in return sends a valid authorization license file to the server security manager.

Still another object of the present invention is to provide systems and associated methods that provide selected localization of content to a client where a link is valid only for a recorded selected location.

Yet another object of the present invention is to provide systems and associated methods that provide selected localization of content to a client at a usage time at a selected localization a 0-Cinema setup video playback is authorized In one embodiment of the present invention, a venue display system provides selected localization of content to a client and includes a server and a processor.

The server is configured to provide selected localization of content from at least one of: a venue display; a 0-Cinema or alternative content; and at a selected location. A screen management system (SMS) is included as is a venue display management system configured to assist in localization of content at the selected location. A storage device stores content.

In another embodiment a method provides localization of content to a client. Content is accessed from at least one of: a video, movie, media from a display venue, and media from any public place where a movie or video is provided. A private or public 0-Cinema setup is used. At least one of the following is used: addition of a GPS receiver in a server security manager; addition of a playback authorization license file into the server security manager; and (iii) addition of a secured operating workflow. Localization of content is provided at a client selected location.

BRIEF DESCRIPTION OF THE DRAWINGS

FIG. 19 is a diagram illustrating the setting of the counter number, the calculated syndrome, and the saved syndrome in each of the iterations of the MPA based decoding of LDPC codes.

DETAILED DESCRIPTION

Figure 1:
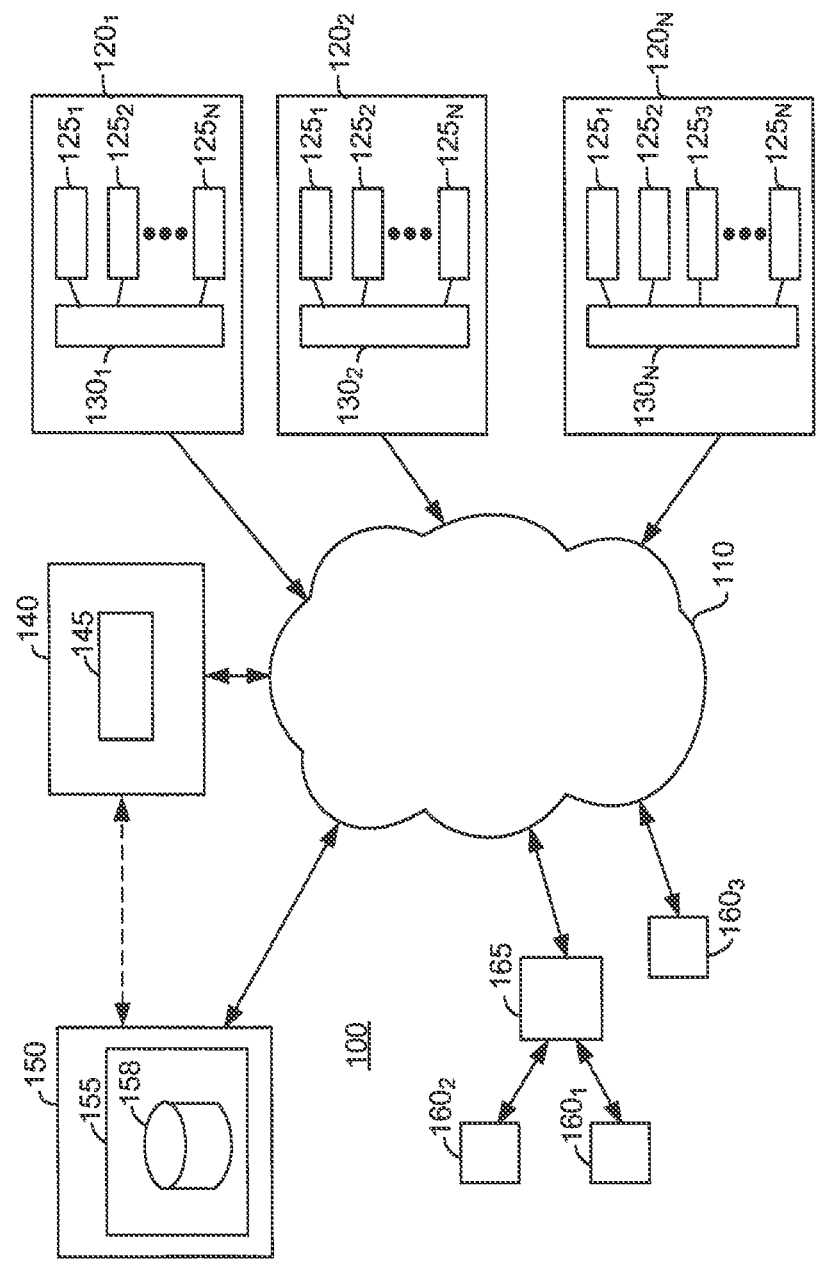
FIG. 1 illustrates a high level block diagram of a network environment including components of a venue display system that can be used with the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a "mobile device" includes, but is not limited to, a mobile device, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server, TMS and equivalent. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein "message rendering device" includes a mobile device,

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "internet" is a global system of interconnected computer networks that use the standard web protocol suite (TCP/IP) to serve billions of users worldwide. It is a network of networks that consists of millions of private, public, academic, business, and government networks, of local to global scope, that are linked by a broad array of electronic, wireless and optical networking technologies. The internet carries an extensive range of information resources and services, such as the inter-linked hypertext documents of the World Wide Web (WWW) and the infrastructure to support email. The communications infrastructure of the internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other internet users. An extranet can be an intranet mapped onto the public internet or some other transmission system not accessible to the general public, but managed by more than one company's administrator(s). Examples of extranet-style networks include but are not limited to:
LANs or WANs belonging to multiple organizations and interconnected and accessed using remote dial-up.
LANs or WANs belonging to multiple organizations and interconnected and accessed using dedicated lines.
Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:
A LAN.
A Wide-area network (WAN) that is comprised of a LAN that extends usage to remote employees with dial-up access.
A WAN that is comprised of interconnected LANs using dedicated communication lines.
A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

As used herein, the term "Attribute" is a characteristic or property of an entity. In the context of the present invention a component attribute can include the component's serial number, product type, installation date, manufacturer, public certificate, public key, location or any other characteristic or property that can be associated with that particular component.

As used herein, the term "Auditorium" is a room or location in which a gathering can take place. In the context of cinemas an auditorium is the location within a display venue in which the movie is displayed for viewing by a group of people. An auditorium can also be a location for a private gathering of only a single occupant. A display venue (theater) may have one or more auditoriums.

As used herein, the term "Digital component(s)" are the devices that enable digital content to be transformed from code to a screen presentation, and can include a D-Cinema setup that can include: (i) a D-Cinema server, D-Cinema projector and D-Cinema peripherals associated with digital displays. In some instances a single digital component can receive, decrypt, convert the code to images, and project those images on a screen. In other instances many separate components are required to accomplish the same goal. While a digital projector is certainly a digital component, other components used to facilitate the projector's operation may also be considered digital components.

As used herein, the term "Venue Display" is anyplace where a large screen is used for the display of information, messages, videos, performers, music, including but not limited to a theater, and the like, (also referred to herein as a theater) is a location housing one or more auditoriums.

As used herein, the term "Private Key Cryptography" is a form of cryptography in which the key used to encrypt a message differs from the key used to decrypt it. In public key cryptography, a user has a pair of cryptographic keys-a public key and a private key. The private key is kept secret, while the public key may be widely distributed. Incoming messages would have been encrypted with the client's public key and can only be decrypted with his corresponding private key. The keys are related mathematically, but the private key cannot be practically derived from the public key.

As used herein, the term "Public Key Certificate" or identity certificate is an electronic document which incorporates a digital signature to bind together a public key with identity information such as the name of a person or an organization, their location, and so forth. The certificate can be used to verify that a public key belongs to a particular component.

As used herein, the term "Secret Key Cryptography", as symmetric cryptography, uses a single secret key for both encryption and decryption. To use symmetric cryptography for communication, both the sender and receiver would have to know the key beforehand, or it would have to be sent along with the personalized message.

As used herein the terms "interactive venue display system" and "interactive cinema" refer to the participation of the audience in some or all aspects of a display venue system or cinema, e.g. giving the audience an active role in the showing of movies, or other content, whereby the audience not only receives information but also sends back audience input information.

As used herein the term "content" is widely used to refer to a specific piece of material consisting of visual images and/or sound or to a collection of such pieces.

As used herein the term "interactive content" is content that is adapted in real-time by interaction of an audience or any other external source. Interactive cinema gives the audience an active role in the showing of movies and other digital data.

As used herein the term "alternative content" is to be understood as entertainment programming other than movies that can be played in a digital cinema environment. Possibilities include sports and other live events. Alternative sources are usually connected via the second input of a digital cinema projector and a suitable cinema audio adapter. In the remainder of the description, the term content is to be understood as comprising interactive and alternative content.

As used herein the term "display" is a communication at a display venue with or without text, with or without graphics, including but not limited to personalized messages at venue display such as movie display venues, that is customized, created solely by an individual, created using a template, customized using a third party template, and the like that is displayed at a venue with a screen where the display is seen on a screen.

As used herein a "personalized message" is a display, as defined above, and can include a message from a client that is displayed at a display venue which can be customized. As a non-limiting example the personalized message can be an email, a whisper message, an SMS text message, an audio message, a visual message, a video call, a mobile device call, a message formatted for processing with whisper service software and the like. Personalized messages can include templates for messages, images, videos, collectively "personalized message", and the like.

As used herein A Cinecardz (hereafter recipient gift) is a gift from a first party to a recipient relative to venue displays with the recipient receiving a display, as defined above, which can be a personalized message that is displayed at a display venue which can be customized, as defined herein. When the recipient receives the recipient gift he/she does not know what it's for, and the recipient gift is for a screening, preferably later, for the recipient that is directed to the recipient, including but not limited to a photo, communication, celebration message, any type of the message directed to the recipient, personalized message, and the like. In one embodiment when the received by the recipient. In one embodiment the recipient does not know what the recipient gift is for. In one embodiment the recipient can become the beginning of a screen, with optionally a photo, message, and the like shown.

In one embodiment, illustrated in FIG. 1 a venue display system 100, and associated methods, provide a SDK, text and web services for clients to make personalized messages that are distributed for sale to a client for display at a venue display. As non-limiting examples venue displays include cinema, events, concerts, sports venues, and the like.

FIG. 1 illustrates one embodiment of a digital cinema system (venue display system) 100 that can be used for implementing embodiments in accordance with the present invention. As a non-limiting example the venue display system 100 can include a content server 110, a digital projector 120, and one or more storage devices 130, 140. In one embodiment, the content server 110 is a part of a screen management system (SMS) 150. In this case, the system 100 also includes a theatre management system (TMS) 160 and a screen automation system (SAS) 170.

The TMS 160, with at least one processor 165, manages the overall workflow and equipment within a theatre; and provides control, supervision and report status on the theatre equipment. In general, a movie theatre can have multiple auditoriums, each with its own screen management and automation systems, digital cinema projector and associated screen. One example of a TMS is TMS v3.0, created and marketed by Technicolor Digital Cinema, of Burbank, Calif.

In a TMS, exhibitors may create show playlists (SPLs) each containing a sequence of composition playlists (CPLs) that include the personalized messages, which includes sound and/or picture assets, and data relating to how these assets are to be presented. These SPLs and the CPLs referenced by the SPLs are distributed to various players, e.g., auditoriums in one or more theatres, and each player is instructed or scheduled to play the SPL for the theatre's audience.

Content server 110 contains instructions and data for controlling both the digital projector 120 and the SAS 170. A decoder (not shown) is also included in the server 110 for responding to commands received from the TMS 160. At least one processor (e.g., processor 115) associated with, or provided in the server 110, is used for processing playlists according to embodiments of the present invention. Examples of digital cinema server manufacturers include Dolby Laboratories in San Francisco, Calif.; Doremi Digital Cinema in Burbank, Calif.; and Eastman Kodak in Rochester, N.Y.; among others.

Digital cinema server 110, which has at least read access to a storage device 140 (may be external or internal to the server), is configured for retrieving a composition from storage and decoding picture and audio essence. During the playout of digital content, picture essence and timing information relating to the presentation of digital content are provided by the server 110 to the projector 120. Images are generated from the picture essence by a processor 125 associated with the projector 120 and projected onto a screen 180. Digital cinema projectors are available from several manufacturers, e.g., Barco Media & Entertainment, LLC, in Rancho Cordova, Calif.; NEG Corporation of America in Irving, Tex.; and Sony Electronics, Inc. in Park Ridge, N.J.; among others. Audio essence is provided by the server 110 to an audio reproduction chain (not shown), which delivers the audio component associated with or accompanying the picture essence to the audience.

Once a template is supplied the venue display system 100 validates its technical compliance, and if positive integrates it in a store. The process is similar to submitting an app to the AppStore. As non-limiting examples, the personalized messages and the like include but are not limited to, any kind of congratulations, wedding announcements, proposals, baby announcements, "bon voyage", good luck, good wishes, love personalized messages/declaration, happy birthday and the like.

In one embodiment the venue display system 100 provides a SDK and a text and web services to build personalized messages, templates that are the personalized message, image and the like sold to the client 160 that will customize it. Once a template is supplied the venue display system 100 and methods of the present invention validates its technical compliance, and if positive integrates it in the store. The process is similar to submitting an app to the AppStore. Creators get a revenue share for submitting new templates in exchange of full rights transfer. If as a developer you want to create a personalized message, image and the like s for the present invention, you may need to subscribe to the "SDK annual subscription", which will give you access to all tools. When a personalized message is validated the venue display system 100 sends a notification to the client. If the client fails to update the personalized message and make it compliant in less than a selected time period, the venue display system 100 pays the client back, and release the screening slot to be available for another client to book a personalized message.

The personalized message is created or customized by the user. In one embodiment the venue display system 100 provides personalized messages template that the user can customize. The user can choose personalized messages from an extended portfolio, and customize some fields like a personalized message, and/or the sender's name, and/or the receiver's name, and/or change colors, change backgrounds, change audio, change typography, change music, upload a picture, upload someone's face picture, upload an image, and the likes. The fields to customize depend on the personalized messages.

The customization of the personalized messages can be done online using HTML/JavaScript technologies, or Adobe Flash technologies, any other web technologies allowing the user to input personalized message, choices or pictures, and preview the personalized messages personalized and customized, or at least preview part of it. The client is able to preview and see online what the customized personalized messages will look like as displayed on the big screen.

Customization depends on many factors. It goes from selecting content from pre-defined lists to inputting your own personal text. In one embodiment the personalized message can include picture, videos, audio, and the like.

In one embodiment a personalized message can be exported to other media. As non-limiting examples personalized message can be outputted as a video, HD or not, that can then be sent to mobile devices, the cloud, more particularly cloud storage, shared on video including but not limited to social networks, mobile device videos, HD Videos and the like. These allow the client to watch, see and share the personalized product at its will.

In one embodiment after a personalized message is played in a display venue it can be used as an e-card that can be sent to friends, shared on social media, on media other than a cinema screen and the like.

In one embodiment the personalized message is smoothly captured at a movie rate that can change from time to time, depending on available technology.

In one embodiment the personalized message is transcoded and displayed at an event, including cinema, screen, including a cinema display, at a compliant format.

In one embodiment the personalized message is displayed at the display venue 120 without the effect of flicking due to a conversion at different frame rates.

In one embodiment the personalized message is displayed at a display venue 120 with smooth-less of rendering.

In one embodiment the personalized message is displayed at the display venue 120 and takes into account the hardware acceleration and a computation time of each image that is dependent on the display venue.

In one embodiment the personalized message is displayed at the display venue 120 that imposes a constraint to designers of animations.

In one embodiment the personalized message requires a box to be installed at each display venue. As a non-limiting example, the box routes metadata relative to the personalized message. The box can be used to route the metadata to the appropriate venue display screen, and the appropriate time. In one embodiment, the box is a digitated mail box. The box communicates to DC servers, TMS and equivalent, and to a cloud platform.

In one embodiment a TMS is not required but can be used. In one embodiment present invention tries its maximum to be compatible with all major server providers on the cinema market and all the available TMS too. It is subject of course of the compatibility of the server or TMS (access to their API for scheduling, and playlist changes is required.

Referring to FIG. 1, the creation of a recipient gift is illustrated. On the top left is a booking of the recipient gift to the recipient. The first party can use the app via a variety of devices and methods, including but not limited to a web site, or to the cinema website, mobile device, mobile device equivalent, and the like. Once the recipient has registered the recipient gift the first party of the recipient can enter its texts, photos, personalized messages, messages from a list of messages, and the like, via a system 100 back-end or through the cloud. As illustrated on the right of FIG. 1 once the recipient gift is created it then be displayed at a venue display, cinema, as any personalized message disclosed herein can be displayed. However, before U1e created recipient gift is displayed the system 10 performs a check/filtering to ensure H1 at the compliance, as disclosed herein, and if in non-compliance H1e creator of the created recipient gift is notified, makes changes in order to make it complaint. In one embodiment the mechanism of connection is to publish a field in an incoming box for the first party of recipient, with a unique ID, a field is then assigned, and then, it is moved to H1e right screen and information highlands are analyzed via the cloud or the system 10 back-end. The creator of the created recipient created can be rejected by the first party or the recipient, and if rejected there can be a refund. In one embodiment the recipient is invited to a cinema event at the same time that the first party is attending. In one embodiment the created recipient gift is only one per show.

Figure 2:
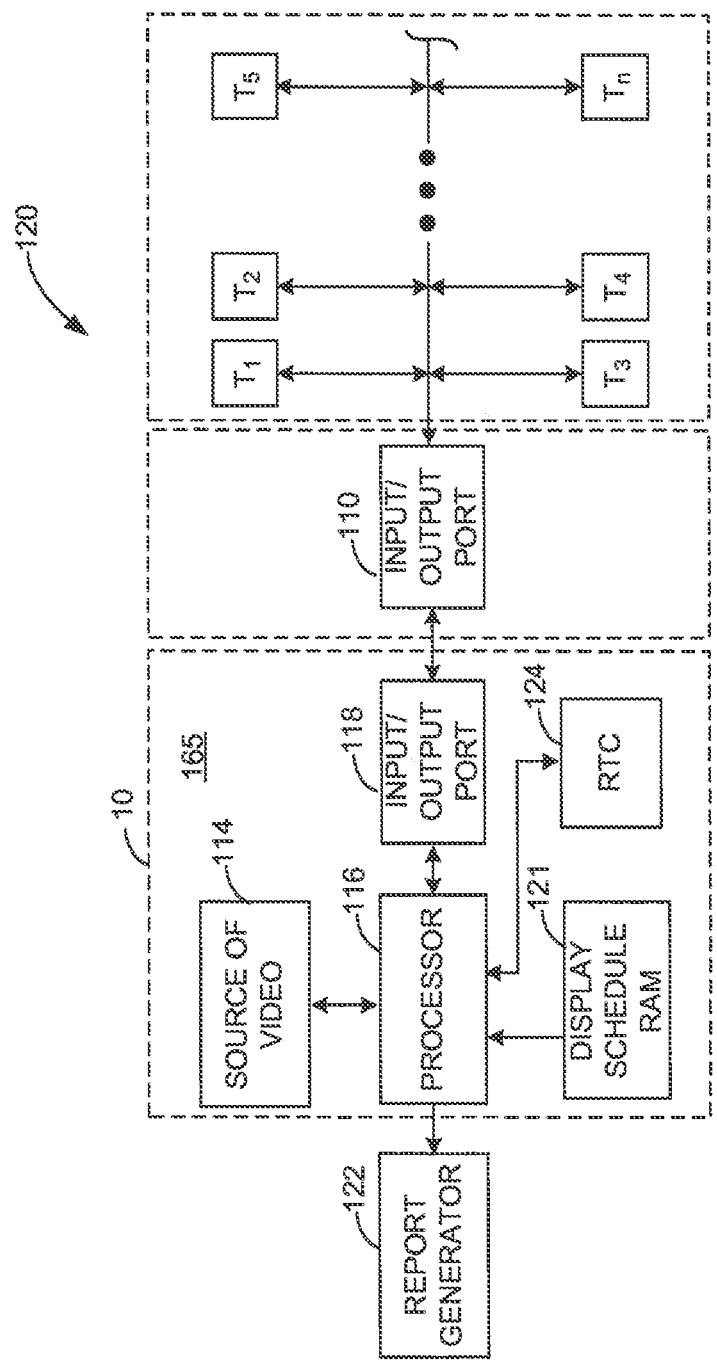
FIG. 2 is a schematic block diagram of a system for managing display venue's customization of media contents and the like in one embodiment of the present invention.

In one embodiment, illustrated in FIG. 2, a venue display system 100 at the display venue 120 is coupled to Network Systems 110. Data packets are passed between routers and switches that make up Network System based on the hardware's instantaneous view of the best path between source and destination nodes specified in the packet.

Coupled to the Network Systems 110 are one or more display venues 120 1, 120 2, 120 *n* (collectively 120). Each display venue 120 includes a plurality of digital components 125 1, 125 2, . . . 125 *n* (collectively 125) and a data collector 130 1, 130 2, . . . 130 *n* (collectively 130).

Also coupled to the wide area Network Systems 110 is a server, TMS and equivalent 140. The server, TMS and equivalent 140, according to one embodiment of the present invention, hosts a service module 145 configured to provide venue display system 100 services. The service module 145 provides venue display system 100 level services including web services, display venue services, and the like. A data repository 150 is also coupled to the wide area Network Systems 110 and includes a display venue module 155 and data storage medium 158.

In another embodiment of the present invention, the data repository 150 is coupled to the server, TMS and equivalent 140 via a direct link bypassing the wide area Network Systems 110. The storage medium can take many forms including tape, hard disc, flash, and any other medium capable of persistently storing data. In one embodiment the display venue module 155 can take the form of software and/or firmware and, according to one embodiment, reside in random access memory or read only memory of a computing device as appropriate. Indeed many of the modules of the venue display system 100 can take the form of one or more modules of executable instructions embodied in the form of computer readable code.

These program codes typically reside in a persistent memory source associated with a computer and/or processor 116 and, upon loading into a random access memory source, are executed by the processor 116.

Also coupled to the Network Systems 110 are a plurality of clients 160 1, 160 2, . . . 160 $p$ (collectively 160). Each client 160, according to one embodiment of the present invention, is coupled directly to the wide area Network Systems 110 and can accordingly communicate with the service module 145 hosted by the server, TMS and equivalent 140. In another embodiment of the present invention, interposed between one or more clients 160 and the wide area Network Systems 110 is a content distributor 165. The distributor 165 acts as an intermediary for the client's 160 in the control and distribution of digital content.

A digital cinema system (venue display system) 100 that can be used for implementing embodiments in accordance with the present invention. As a non-limiting example the venue display system 100 can include a content server 110, a digital projector 120, and one or more storage devices 130, 140. In one embodiment, the content server 110 is a part of a screen management system (SMS) 150. In this case, the system 100 also includes a theatre management system (TMS) 160 and a screen automation system (SAS) 170.

The TMS 160, with at least one processor 165, manages the overall workflow and equipment within a theatre; and provides control, supervision and report status on the theatre equipment. In general, a movie theatre can have multiple auditoriums, each with its own screen management and automation systems, digital cinema projector and associated screen. One example of a TMS is TMS v3.0, created and marketed by Technicolor Digital Cinema, of Burbank, Calif.

In a TMS, exhibitors may create show playlists (SPLs) each containing a sequence of composition playlists (CPLs) that include the personalized messages, which includes sound and/or picture assets, and data relating to how these assets are to be presented. These SPLs and the CPLs referenced by the SPLs are distributed to various players, e.g., auditoriums in one or more theatres, and each player is instructed or scheduled to play the SPL for the theatre's audience.

Content server 110 contains instructions and data for controlling both the digital projector 120 and the SAS 170. A decoder (not shown) is also included in the server 110 for responding to commands received from the TMS 160. At least one processor (e.g., processor 115) associated with, or provided in the server 110, is used for processing playlists according to embodiments of the present invention. Examples of digital cinema server manufacturers include Dolby Laboratories in San Francisco, Calif.; Doremi Digital Cinema in Burbank, Calif.; and Eastman Kodak in Rochester, N.Y.; among others.

Digital cinema server 110, which has at least read access to a storage device 140 (may be external or internal to the server), is configured for retrieving a composition from storage and decoding picture and audio essence. During the playout of digital content, picture essence and timing information relating to the presentation of digital content are provided by the server 110 to the projector 120. Images are generated from the picture essence by a processor 125 associated with the projector 120 and projected onto a screen 180. Digital cinema projectors are available from several manufacturers, e.g., Barco Media & Entertainment, LLC, in Rancho Cordova, Calif.; NEG Corporation of America in Irving, Tex.; and Sony Electronics, Inc. in Park Ridge, N.J.; among others. Audio essence is provided by the server 110 to an audio reproduction chain (not shown), which delivers the audio component associated with or accompanying the picture essence to the audience.

Once a template is supplied the venue display system 100 validates its technical compliance, and if positive integrates it in a store. The process is similar to submitting an app to the AppStore. As non-limiting examples, the personalized messages and the like include but are not limited to, any kind of congratulations, wedding announcements, proposals, baby announcements, "bon voyage", good luck, good wishes, love personalized messages/declaration, happy birthday and the like.

In one embodiment the venue display system 100 provides a SDK and a text and web services to build personalized messages, templates that are the personalized message, image and the like sold to the client 160 that will customize it. Once a template is supplied the venue display system 100 and methods of the present invention validates its technical compliance, and if positive integrates it in the store. The process is similar to submitting an app to the AppStore. Creators get a revenue share for submitting new templates in exchange of full rights transfer. If as a developer you want to create a personalized message, image and the like s for the present invention, you may need to subscribe to the "SDK annual subscription", which will give you access to all tools. When a personalized message is validated the venue display system 100 sends a notification to the client. If the client fails to update the personalized message and make it compliant in less than a selected time period, the venue display system 100 pays the client back, and release the screening slot to be available for another client to book a personalized message.

The personalized message is created or customized by the user. In one embodiment the venue display system 100 provides personalized messages template that the user can customize. The user can choose personalized messages from an extended portfolio, and customize some fields like a personalized message, and/or the sender's name, and/or the receiver's name, and/or change colors, change backgrounds, change audio, change typography, change music, upload a picture, upload someone's face picture, upload an image, and the likes. The fields to customize depend on the personalized messages.

The customization of the personalized messages can be done online using HTML/JavaScript technologies, or Adobe Flash technologies, any other web technologies allowing the user to input personalized message, choices or pictures, and preview the personalized messages personalized and customized, or at least preview part of it. The client is able to preview and see online what the customized personalized messages will look like as displayed on the big screen.

Customization depends on many factors. It goes from selecting content from pre-defined lists to inputting your own personal text. In one embodiment the personalized message can include picture, videos, audio, and the like.

In one embodiment a personalized message can be exported to other media. As non-limiting examples personalized message can be outputted as a video, HD or not, that can then be sent to mobile devices, the cloud, more particularly cloud storage, shared on video including but not limited to social networks, mobile device videos, HD Videos and the like. These allow the client to watch, see and share the personalized product at its will.

In one embodiment after a personalized message is played in a display venue it can be used as an e-card that can be sent to friends, shared on social media, on media other than a cinema screen and the like.

In one embodiment the personalized message is smoothly captured at a movie rate that can change from time to time, depending on available technology.

In one embodiment the personalized message is transcoded and displayed at an event, including cinema, screen, including a cinema display, at a compliant format.

In one embodiment the personalized message is displayed at the display venue 120 without the effect of flicking due to a conversion at different frame rates.

In one embodiment the personalized message is displayed at a display venue 120 with smooth-less of rendering.

In one embodiment the personalized message is displayed at the display venue 120 and takes into account the hardware acceleration and a computation time of each image that is dependent on the display venue.

In one embodiment the personalized message is displayed at the display venue 120 that imposes a constraint to designers of animations.

In one embodiment the personalized message requires a box to be installed at each display venue. As a non-limiting example, the box routes metadata relative to the personalized message. The box can be used to route the metadata to the appropriate venue display screen, and the appropriate time. In one embodiment, the box is a digitated mail box. The box communicates to DC servers, TMS and equivalent, and to a cloud platform.

In one embodiment a TMS is not required but can be used. In one embodiment present invention tries its maximum to be compatible with all major server providers on the cinema market and all the available TMS too. It is subject of course of the compatibility of the server or TMS (access to their API for scheduling, and playlist changes is required.

Referring to FIG. 1, the creation of a recipient gift is illustrated. On the top left is a booking of the recipient gift to the recipient. The first party can use the app via a variety of devices and methods, including but not limited to a web site, or to the cinema website, mobile device, mobile device equivalent, and the like. Once the recipient has registered the recipient gift t!1e first party of the recipient can enter its texts, photos, personalized messages, messages from a list of messages, and the like, via a system 100 back-end or through the cloud. As illustrated on the right of FIG. 1 once the recipient gift is created it then be displayed at a venue display, cinema, as any personalized message disclosed herein can be displayed. However, before U1e created recipient gift is displayed the system 10 performs a check/filtering to ensure H1 at the compliance, as disclosed herein, and if in non-compliance H1e creator of the created recipient gift is notified, makes changes in order to make it complaint. In one embodiment the mechanism of connection is to publish a field in an incoming box for the first party of recipient, with a unique ID, a field is then assigned, and then, it is moved to H1e right screen and information highlands are analyzed via the cloud or the system 10 back-end. The creator of the created recipient created can be rejected by the first party or the recipient, and if rejected there can be a refund. In one embodiment the recipient is invited to a cinema event at the same time that the first party is attending. In one embodiment the created recipient gift is only one per show.

In one embodiment, illustrated in FIG. 2, a venue display system 100 at the display venue 120 is coupled to Network Systems 110. Data packets are passed between routers and switches that make up Network System based on the hardware's instantaneous view of the best path between source and destination nodes specified in the packet.

Coupled to the Network Systems 110 are one or more display venues 120 1, 120 2, 120 *n* (collectively 120). Each display venue 120 includes a plurality of digital components 125 1, 125 2, . . . 125 *n* (collectively 125) and a data collector 130 1, 130 2, . . . 130 *n* (collectively 130).

Also coupled to the wide area Network Systems 110 is a server, TMS and equivalent 140. The server, TMS and equivalent 140, according to one embodiment of the present invention, hosts a service module 145 configured to provide venue display system 100 services. The service module 145 provides venue display system 100 level services including web services, display venue services, and the like. A data repository 150 is also coupled to the wide area Network Systems 110 and includes a display venue module 155 and data storage medium 158.

In another embodiment of the present invention, the data repository 150 is coupled to the server, TMS and equivalent 140 via a direct link bypassing the wide area Network Systems 110. The storage medium can take many forms including tape, hard disc, flash, and any other medium capable of persistently storing data. In one embodiment the display venue module 155 can take the form of software and/or firmware and, according to one embodiment, reside in random access memory or read only memory of a computing device as appropriate. Indeed many of the modules of the venue display system 100 can take the form of one or more modules of executable instructions embodied in the form of computer readable code.

These program codes typically reside in a persistent memory source associated with a computer and/or processor 116 and, upon loading into a random access memory source, are executed by the processor 116.

Figure 3:
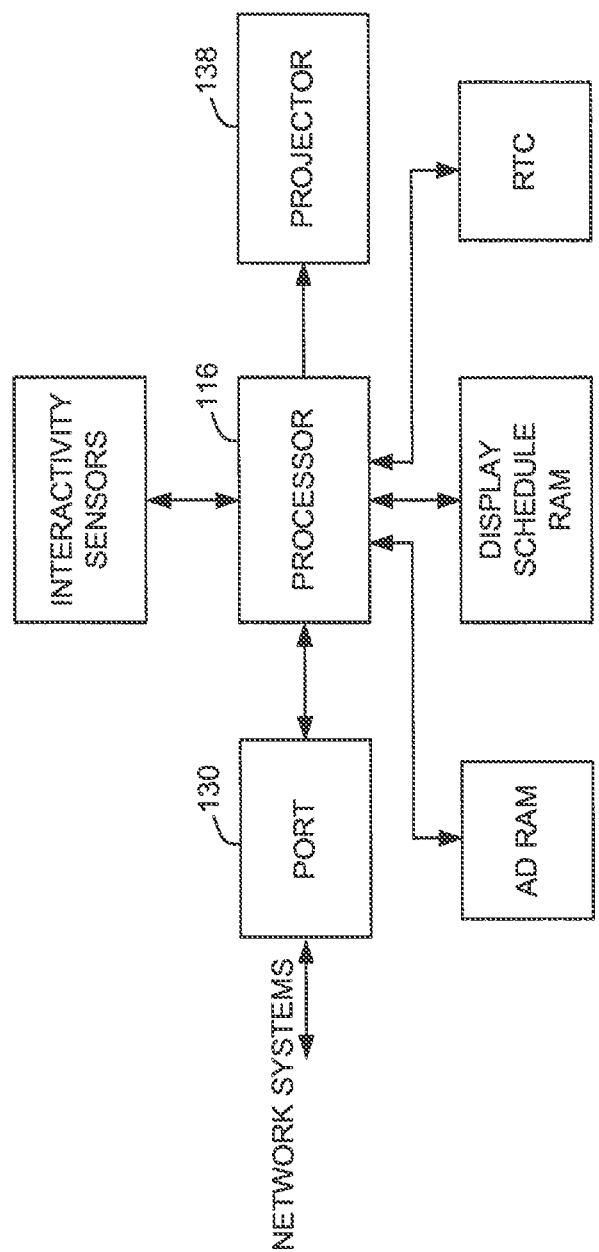
FIG. 3 is a schematic block diagram of components located at one of the display venues shown in FIG. 1 according to one embodiment of the present invention.
Figure 4:
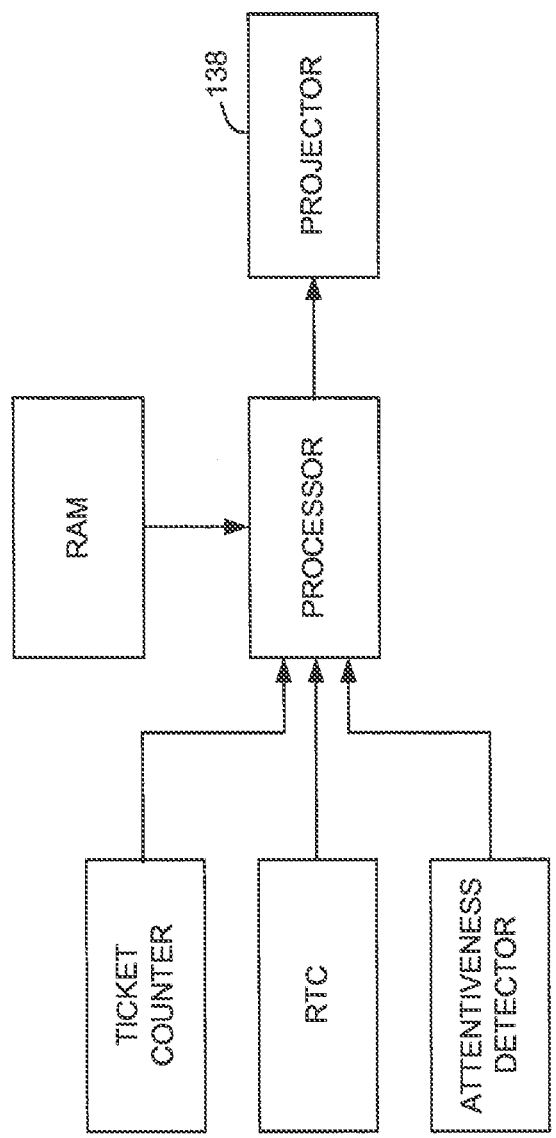
FIG. 4 is a schematic block diagram of components at one of the display venues shown in FIG. 1 for modifying customization of media contents and the like according to one embodiment of the present invention.
Figure 5:
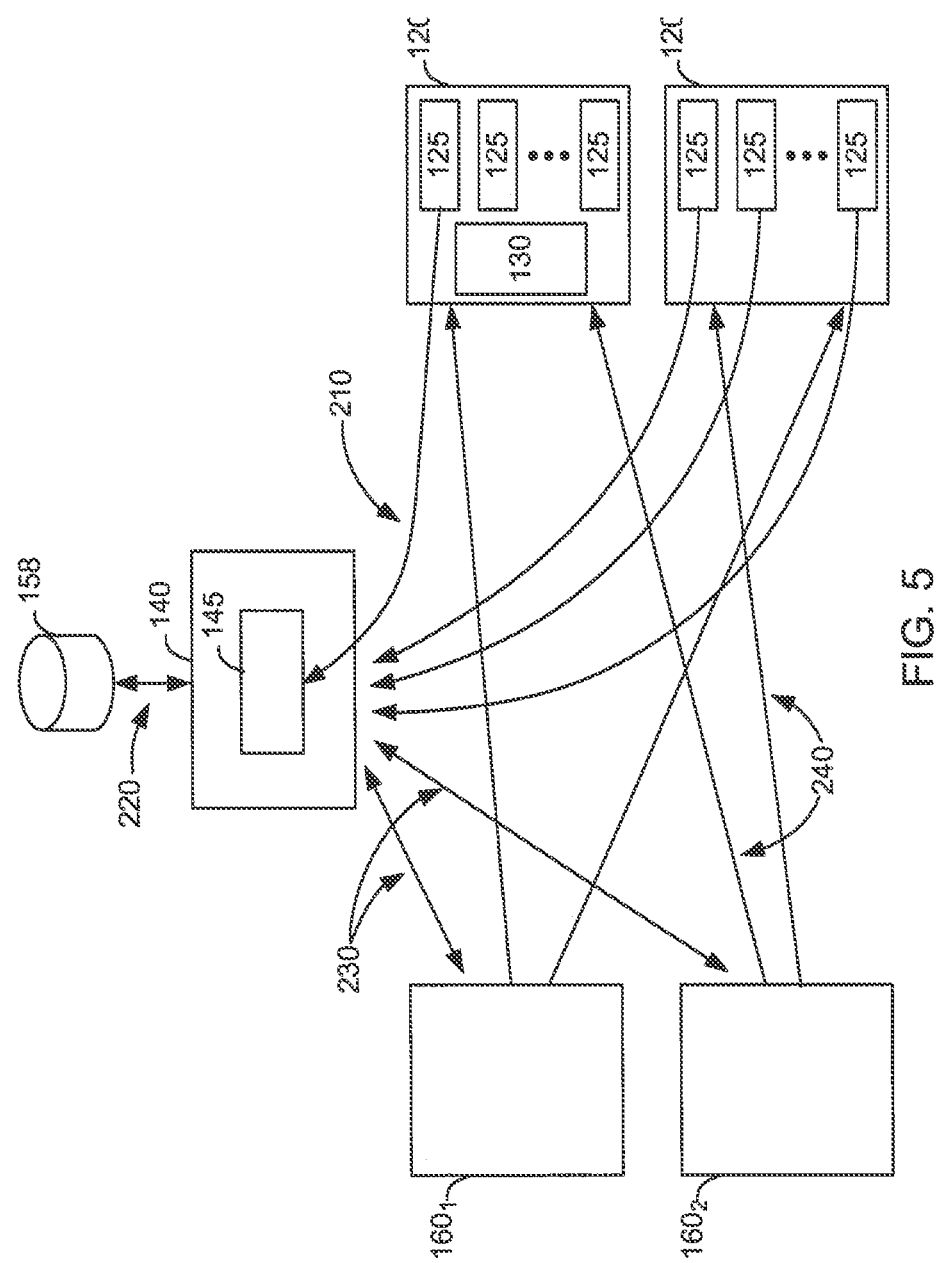
FIG. 5 is a high level data flow block diagram illustrating general flow of data between components of one embodiment of a venue display system 100 in one embodiment of the present invention.

Also coupled to the Network Systems 110 are a plurality of clients 160 1, 160 2, . . . 160 *p* (collectively 160). Each client 160, according to one embodiment of the present invention, is coupled directly to the wide area Network Systems 110 and can accordingly communicate with the service module 145 hosted by the server, TMS and equivalent 140. In another embodiment of the present invention, interposed between one or more clients 160 and the wide area Network Systems 110 is a content distributor 165. The distributor 165 acts as an intermediary for the client's 160 in the control and distribution of digital content. Referring now to FIGS. 3 through 5, in one embodiment the venue display system 100 obtains a personalized message to be displayed via Network System 110 through an input/output port 118. The personalized message can be from a display venue participant/viewer. In one embodiment the port 118 serves to convert the data it receives from a mobile device. The venue system 100 has a processor 116. In one embodiment A RAM 121, which is connected to processor 116, can store the personalized message to be displayed. In one embodiment a real time clock (RTC) 124 is also connected to processor 116 and can provide a time base for operation for the display of a personalized message, as more fully described hereafter. In one embodiment the processor 116 is coupled to a report generator 122.

A digital projector 138, FIG. 5, is able to project onto screen 111 an image with sufficient resolution, brightness various data and video signals in several aspect ratios as desired. In one embodiment the projector 138 is coupled to a computer interface and display many different still and moving video and data signals onto the movie screen. Processor 116 includes programs and memory for carrying out the programs. In one embodiment the digital projector 138 has an input connection 104 from the display venue controller 103, which has the capability of displaying various data and video signals. The display venue controller 103 executes a number of programs illustrated by the blocks, namely a communication venue display system 100 to manage input and output communication between each system and subsystem component, a loop management venue display system 100 to control the loop features such as timing, length and content of the media to be shown via the input connection 104 to the digital projector 138, an interactive quiz/survey system to control the questions and answer data in and output, a ticket interface system to process ticket data and information, a projector control system, a log in system, a people counter system, an personalized message and or image management system, interactive patron inputs from remote wireless transmitters are processed through the dual addressable infrared grid (DAIG) controller interface system, a cryptologic system is used to encode data and information, a survey system 128, and data redundancy system used to back-up and monitor data storage and activity.

As digital components are installed and made operational in each venue display system 100, their status is communicated to a service module hosted by a server, TMS and equivalent via Network Systems 110. As a non-limiting example each digital component is the projector 138 or projector system that is used to display digital content including but not limited to movies and the like, on a display screen. In some implementations the digital component may be a single piece of equipment capable of processing and projecting the content while in other implementations the venue display system 100 may include several components that receive, process, and project the content on a screen.

In one embodiment the screen 111 is a liquid crystal display or a projection device utilizing light emitting diode technology (LED). In one embodiment the venue display system 100 includes and other implementation devices, mechanisms, software and the like, for managing attributes of digital media.

Information is conveyed 210 from the venue display systems 100 to the service module. In one embodiment attributes of each digital component 125 are amassed by a data collector 130 and conveyed to the service module 145 periodically. In other embodiments the digital components connect directly to the service module 145 for the conveyance of information.

The service module 145, hosted on a server, TMS and equivalent 140, coupled to Network Systems 110, supports machine-to-machine interaction over Network Systems 110. The display venue 120 accesses an application program interface ("API"), through the data collector 130 or individual digital components 125, to access the requested service. As a non-limiting example the requested service can accept and manage attributes from a number of digital components 125. As a non-limiting example XML can be used for communication. Again as a non-limiting example a Java program can talk to a Perl program, a Windows program can talk to a UNIX application and so on.

As a non-limiting example the service module can use different implementation means including remote procedure calls, service-oriented architecture, and a representational state transfer. A remote procedure call is a distributed function call interface using SOAP. A service-oriented architecture is one in which the personalized message is the basic unit of communication rather than an operation. In this approach as opposed to RPC, the service module relies on a loose coupling because the focus is more on the provider/client contract provided by the service module description language than the underlying implementation details.

Representational state transfer is also referred to as Restful web services. This is an attempt to emulate HTTP and similar protocols by constraining the interface to a set of well-known or standard operations. This process focuses on the state of the resources rather than the personalized message or operation.

In one embodiment an agent-less protocol is used to transfer data to the repository via a service module. Information can be broadcast to the service module which acknowledges to the display venue 120 that the personalized message has been received.

In one embodiment the display venue 120 contacts the service module periodically and uploads data.

In one embodiment attributes of each digital component 125 are periodically pushed to the server, TMS and equivalent 140 based on service module 145. As non-limiting examples these attributes can include, component type, serial number, location, Network Systems address, public certificate, public key and the like. In one embodiment once the data arrives at the service module, it is conveyed 220 to the repository for storage on a persistent storage medium 158, FIGS. 6(*a*) and 6(*b*).

As a non-limiting example, data can be stored in a relational database with retrieval based on one or more of the attribute associations.

In one embodiment the display venue module 155 identifies changes to the information contained within the repository. As data arrives at the repository, it is stored based on its association with a specific display venue 120. When a component attribute associated with a particular display venue 120 changes, the venue control module generates a signal to a system administrator that the repository has been altered. As a non-limiting example for accuracy a signal is given to a system administrator for further scrutiny. In one embodiment a record of all modifications to the repository is maintained until the changes are verified.

As a non-limiting example the attribute repository 158 grows as the number of display venues 120 increases as does the number of digital components 125. To distribute content to an auditorium from a client 160 for viewing, a client 160 must possess the public certificate and public key of the components associated with that auditorium.

Referring to FIGS. 6(*a*) and 6(*b*), as a non-limiting example, content is securely delivered to a particular digital component to encrypt that content using that component's public key. Once encrypted, the content can only be decrypted by that component's private key. In one embodiment a component's public key is used to encrypt a newly generated client private key. The encrypted private key is transmitted 240 to the digital component that uses its private key to decrypt the personalized message. Upon decryption, the digital component 125 possesses the newly generated private key of the client 160. Following in a separate transmission is content encrypted using the public key pair of the client's private key. Using the new private key the digital component can decrypt the content for display.

To gain the public key of a particular component associated with a specific display venue, the client 160 sends a request 230 for a particular key or public certificate to the service module 145. The service module 145 authenticates the client 160 and passes the request for the key (or certificate) to the display venue module 155. The display venue module 155 determines whether the client has authorization to retrieve the requested attribute. When authorization exists, the requested attribute is retrieved from the repository and conveyed 230 back to the client 160. If the client 160 does not possess authorization to view an attribute, a personalized message is sent back to the client rejecting the request. Authorization to view attributes such as keys, serial number of components, and so forth is based on contractual arrangements between the client and the display venues. Periodically the display venue 120 and the clients update the display venue module 155 with current relationships between clients and display venue.

As a non-limiting example in response to the authenticated client having the authority to view an attribute, the attribute is retrieved from the repository and conveyed 230 to the client 160. Once in possession of the client 160, the client uses the information to encrypt the content or a key and transmit the information directly to the display venue/digital component. Encrypted content is targeted specifically for a digital component. In one embodiment the display venue 120 has a venue public key. Using this display venue key, clients can convey digital content securely to the display venue 120 which can then distribute it to a plurality of client systems within that venue.

Figure 6A:
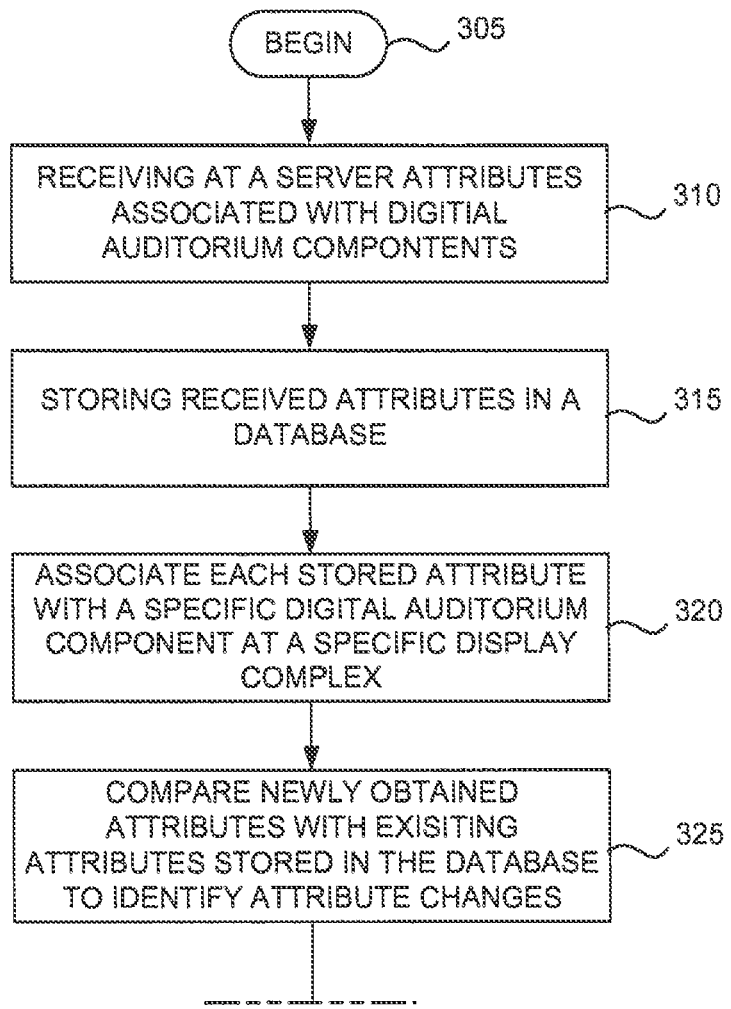
FIGS. 6(a) and 6(b) are high-level flowcharts for the management of digital component attributes in one embodiment of the present invention.
Figure 6B:
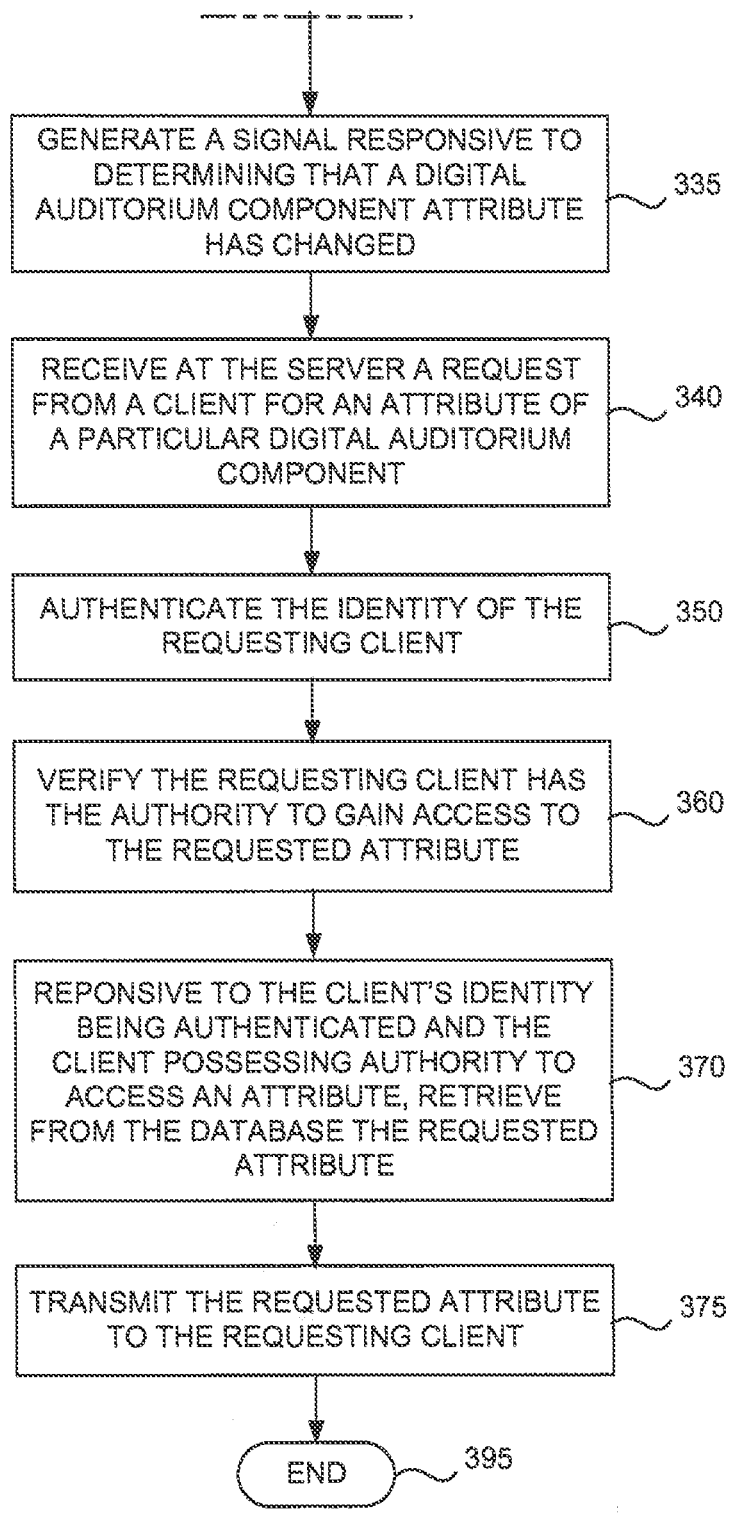

Referring now to FIGS. 6(a) and 6(b) the display of the personalized message at the display venue 120 begins at 305 by a server, TMS and equivalent, receiving 310 attributes associated with digital components located at a plurality of display venue. As a non-limiting example the attributes of the personalized message are extracted directly from components and collected by the display venue 120 prior to being transmitted to the server, TMS and equivalent. In other embodiments changes in the attributes are recognized by the display venue 120 and are pushed to the server, TMS and equivalent to ensure that the data repository possesses timely and accurate data.

Upon receiving attribute data from a plurality of digital components, the server, TMS and equivalent conveys the data to a repository where it is stored 315 in a persistent storage medium. Concurrently with the storage process, or shortly thereafter, the each venue attribute is associated 320 with a specific digital component in a specific display venue. As new information arrives and as new entries in the repository are created, a display venue module 155 compares 330 newly arrived attribute information with data already resident in the repository to identify any specific attribute modification or change.

In response to an identified change the display venue module 155 generates 335 a signal directed to a system administrator or similar entity that an attribute change has occurred. The system administrator can then act to verify the change with the display venue 120 to ensure the information is accurate.

While the verification process is underway, the repository remains accessible to a plurality of clients seeking information about components so as to distribute and display digital content. When a client wishes to convey digital content for a display venue 120 for display by a specific digital component, the client must gain the public key and/or location (Network Systems address) of the component. A request is generated by the client and received 340 by the server, TMS and equivalent for attribute information about a particular digital component. For example the request can be for the component's public certificate and public key as well as the Network Systems address for the display venue 120 at which the digital component is resident.

On receipt the service module hosted by the server, TMS and equivalent authenticates 350 the client's identity and verifies 360 that the client has the authority to access the requested attribute. In another embodiment of the present invention, the display venue module 155 at the repository verifies the client's authority.

After the client has been authenticated and the client possesses the proper requisites to access data housed in the repository, the requested data is retrieved 370 from the repository and conveyed to the server, TMS and equivalent. Thereafter the data is transmitted 375 to the requesting client for use in distributing its digital content. Alternatively the display venue module 155, once determining that the client's request is authentic and authorized, can convey the data directly to the client by Network Systems 110.

As a non-limiting example the venue display system 100 enables one or more clients to access attributes from a plurality of digital components. This information is used by the clients to convey secure digital content directly to a digital component for display within that auditorium. In one embodiment the repository of the attributes includes a relational database that is coupled to a service module hosted on a server, TMS and equivalent coupled to Network Systems 110. Digital component attribute data is periodically pushed from the plurality of display venue 120 to ensure that the repository of component attributes is reliably current.

In various embodiments the modules, managers, functions, systems, engines, layers, features, attributes, methodologies, and the like can be implemented as software, hardware, firmware, or any combination of the three. A software component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming.

In one embodiment software programming code can be accessed by the microprocessor from long-term storage media of some type, such as a CD-ROM drive or hard drive. In one embodiment the software programming code is embodied on any of a variety of known media for use with a data processing system, including but not limited to, a diskette, hard drive, CD-ROM, and equivalents.

In one embodiment the code is distributed on such media, or distributed from the memory or storage of one computer system over Network Systems 110 of some type to other computer systems for use by such other systems. In one embodiment the programming code is in the memory and accessed by the microprocessor.

In various embodiments the display venue 120 and/or the clients may connect to the server, TMS and equivalent using a wireline connection, a wireless connection and in a standalone mode without having a Network Systems 110 connection.

The target devices (client or display venue) with which the present invention may be used with a variety of devices, including but not limited to, mobile devices, end-user workstations, mainframes or server, TMS and equivalent on which software is to be loaded, or any other type of device having computing or processing capabilities and the like.

In one embodiment client requests or personalized messages are sent to input port 118 and processor 116 and a two-step validation is performed. The first step validation of the personalized message ensures that it complies with general policies. As a non-limiting example, the general policies include but are not limited to, sex, politics, rudeness, and the like. The personalized message is then validated by an exhibitor prior to show. In one embodiment of validation the exhibitor reads the personalized message, looks at the personalized message/picture, and determine by its own if it will be screened or not. The exhibitor is always in capacity to refuse the screening of a personalized message, image and the like.

The personalized message is created or customized by the user. The venue display system 100 provides a personalized message, image and the like template that the user can customize. The user choose a personalized message, picture, and the like from an extended portfolio, and customize some fields like a personalized message, image and the like and/or the sender's name, and/or the receiver's name, and/or change colors, change backgrounds, change audio, change typography, change music, upload a picture, upload someone's face picture, upload an image, and the likes. The fields to customize depend on the personalized message, image and the like.

In one embodiment if a screening has no personalized message booked, a short promotional message is played encouraging client 160 to book a personalized message, image and the like later for another screening.

If the personalized message fails to play the client 160 will be reimbursed. To know if the personalized message has been correctly played, the box connects to each relevant digital cinema server or TMS, and equivalent structures, to collect playback logs and validates that the right personalized message has properly been played. In the event that it did not the client 160 is notified and reimbursed.

When a personalized message is validated the venue display system 100 sends a notification to the client 160. If the client 160 fails to update the personalized message and make it compliant in less than a selected time period. The venue display system 100 pays the client 160 back, and releases the screening slot to be available for another client 160 to book a personalized message, image and the like.

In one embodiment creators of templates receive a revenue share for submitting new templates in exchange of a transfer of full rights.

The personalized message can last for different lengths of time. In one embodiment, the length is 30 sec. As a non-limiting the example the personalized messages, with or without the personalized part, can be as short as 6 seconds. The length all is dependent on the personalized messages and on the creative that create personalized messages. As a non-limiting example the length is subject to variations and under agreements with the display vendor.

In one embodiment if nobody orders a personalized message a default promotional plays. In one embodiment when there is no booking of a personalized message and the like a promotional message can be played encouraging clients to book a Cinecardz, defined as a gift, which the receiving party relative to venue displays, and the receiving party receives a display, as defined above, which can be a personalized message that is displayed at a display venue which can be customized, as defined herein. When the recipient receives the Cinecardz he/she does not know what it's for, and the Cinecardz is later screening for the recipient of the directed to the recipient, including but not limited to a photo, communication, celebration message, any type of the message directed to the recipient.

If the personalized message fails to play the client can be reimbursed. In one embodiment to know if the personalized message was correctly played the box connects to each relevant digital cinema server or TMS to collect playback logs and validates that the right personalized message has properly been played. In the event that it did not the sender is notified and reimbursed.

The use of servers or TMS is dependent on the venue display 120.

As non-limiting examples, a person/client 160 can customize the personalized message via a plurality of mechanism, including but not limited to the following:

Choosing a color;
Selecting a color set;
Selecting an animation (i.e. the way the personalized message may appear);
Selecting an element in any kind of list of choices;
Selecting a character;
Selecting a background;
Selecting fonts;
Selecting an audio element or sound;
Selecting a music;
Typing any custom personalized message, word or sentence;
Typing the receiver's name;
Typing the sender's name;
Uploading or taking a picture;
Uploading or recording a video or audio personalized message;
Uploading or recording an audio content or audio personalized message;
Uploading a picture;
Uploading a picture of someone's face; and
Any way for the user to input information that will change, customize, or modify the look of the personalized message In one embodiment, a mobile device app is utilized, as more fully described hereafter. In one embodiment, the present invention provides a check to determine if a personalized message is available or not for a venue display system 100, including an event or show.

As a non-limiting example, a button is provided that is coded in Javascript. It queries the cloud system and changes color depending on the personalize message of the present invention availability: —Available: green Already booked: orange, with a field to be notified if the slot becomes available again
Confirmer: red, impossible to order.
Too late: red, impossible to order exhibitor requirements In one embodiment, schedules are not used. Instead manual operation is employed. In other embodiments schedules are utilized. When the screening is correctly scheduled in a relative advance on the server, TMS and equivalent, the box queries these and is able to ingest the personalized message onto the correct server, TMS and equivalent to be played along the correct screening. When no schedule is seen, there are ways to bypass that difficulty. The personalized content may be sent on each server, TMS and equivalent where the movie screened/targeted is present. Then just before the show, the playlists containing the screened movie is update to include the personalized message, on every server, TMS and equivalent the playlist is. Therefore the playback in manual mode should still play the right personalized message.

In one embodiment, the personalized messages may be sent behind a firewall. As a non-limiting example this can be achieved using ports, including but not limited to, TCP80, TCP and UDP 443, TCP21, TCP22 and the like, that are opened and enable the Box to communicate with the cloud platform. As a non-limiting example, in one embodiment the box initiates the connection to the cloud with web services and downloads the personalized message through HTTP, FTP, or any relevant manner. This can be achieved in a secured way or not, depending on the need and confidentiality of the data transmitted.

In one embodiment, when the content is not validated, by default it is rejected and a default personalized message plays. However, the user is responsible for the loss of the slot and may be charged the cost of the personalized message.

In one embodiment an interface is provided for content moderation. This shows the pending personalized messages and user generated content. In one embodiment each personalized message can be viewed and has an OK/Accept button and a KO/Reject button and the user clicks the one that are ok with the terms and conditions. In another embodiment the moderator can add a reason for the rejection of the content to tell the user why it has been rejected.

In one embodiment the exhibitor decides where the personalized message is on the show playlist. In one embodiment a new macro is added to the user's SPL template that says something like, as a non-limiting example, "personalized message here". The appliance replaces that beacon each time and resets after the performance, show, activity and the like is finished. The personalized message is the default message, image and the like advertisement that is played when no message has been booked. It is not a macro. That default Product/ad is replaced by the personalized message only when there is one.

In one embodiment, the following is taken into account: (i) general settings: Network Systems 110, time (NTP), identity (location); (ii) Screens: IP address or host, API port, credentials and the like. The Box is configured that can be achieved via the cloud central provisioning system or manually, locally on the box. In one embodiment the box is configured with the list of the server, TMS, and enough information to access these and their API.

As a non-limiting example, the appliance runs a Debian or any Linux distribution with proprietary software. There are many pieces of software on the box that are done to perform various tasks (check if new Cinecardz is available, download it, check it, gather screenings, gather schedules on servers/TMS, ingest content, gather playlists, modify playlist, check and gather playback logs, etc.).

In one embodiment the appliance is rackable. In other embodiments it is non-rackable, depending on the hardware at the display venue.

In one embodiment the appliance may be virtualized. In various embodiments the appliance is used for encodings.

In one embodiment the appliance benefits from Active Services with active boot and active care available. In one embodiment the Box/appliance contains loads of software from the venue display system 100 specific to a particular project.

In one embodiment a user purchases an event ticket on Network Systems 110. A personalized message activator, e.g., button and the like, advises the user if it can order a personalized message If not then the user is redirected to the platform to choose and customize a message, image and the like. A design is selected, the message is customized, and the user pays and then proceeds.

In another embodiment the user can access the service and the web store on its mobile device.

If the venue display system 100 moderates the message then the user has a certain amount of time to modify it to conform.

The user is reimbursed under a number of conditions, including but not limited to, the personalized message was moderated and the user failed to place in a condition of compliance, an error occurred and the personalized message did not play, and the like.

A personalized message can be personalized with or without the purchase of an event ticket.

In one embodiment there is a transformation of an HTML page, or Adobe Flash, or other animation formats (not limitation) into a DCP, more generally in a video and the like. In one embodiment the resulting video is then played at the venue display 120 including but not limited to a cinema.

In one embodiment a fluidity of an animation rendering is provided by Network Systems browsers. As a non-limiting example images are rendered at a rate of about 60 images/second. As a non-limiting example this can occur when a client watches it on its screen through its browser. In other embodiments it can be 30 fps to 60 fps. In one embodiment, only the rendering of areas is refreshed which mean they determine in advance which portion of a display needs to be recalculated to treat only the surface portion and optimize rendering. These browsers make maximum use of hardware graphics acceleration to perform rendering.

In one embodiment the venue display system 100 smoothly captures the rendering hardware accelerated at a movie rate. As a non-limiting example this can be 24 frames per second, with very high resolution, i.e. at least 2K (2048×1080) and without compression to ensure optimal quality on a very large screen, up to 60 feet & more. In one embodiment the capture quality is done without compression, but the output is then compressed to DCP, which is still lossy, even if it has great quality.

As a non-limiting example, the effect of flicking is reduced. As a non-limiting example flicking is reduced due to playback at low frame rates including but not limited to 24 frames/second. In one embodiment motion blur technics are utilized.

In one embodiment a capture of a personalized message may be done through OSR, but is not limited to such a method.

In one embodiment a constraint is provided to designers of animations. As a non-limiting example the constraint can be an introduction of a JavaScript variable to set a coefficient to slowdown the animation. The higher the variable, the slower the animation. As a non-limiting example, slowing down by a factor of 4 captures images at a rate of 6 per second (24/4). Temporal irregularities are decreased by this ratio and the result IS visually acceptable.

As non-limiting examples, the following problems are resolved: (i) manage a variable of slowdown; (ii) executing in RAM memory to speed up capture and avoid disturbing clocks by recording the intermediate images; (iii) provide an overlay to the browser; and the like.

In one embodiment more than one technique is used to capture animation. As non-limiting examples OSR is used where an off screen browser captures a slowed down animation; screen capture technics can also be employed to capture the animation/personalized message. The choice of technology used to capture depends on the animation/personalized message/message, image and the like, including but not limited to HTML, or Flash, or HTML with 30 and the like.

In one embodiment flickering is corrected by passage of a rendering at 60 fps to 24 fps that introduces an effect of flickering as the images do not have any blur rendering. In one embodiment this is achieved by capturing the animation higher than 24 fps. As a non-limiting example this can be 5 times faster at 120 fps, and to fade 5 images per 5 images.

To set up the venue display system 100 to display the personalized message and the user communicated personalized messages, the system administrator 126 selects the personalized message to be played from the video source using known methods. The personalized message can be displayed on either or both a computer monitor and the display screen 111 during the set up process. The personalized message may be displayed at a first predetermined position on the display screen 111.

Many options are available with the current software to optimize the venue display system 100. Some of the options are described below.

The system administrator 126 can enter system administrator communicated text to be displayed along with the user communicated personalized messages from the third party as part of the queue or immediately if desired. The system administrator communicated text may be displayed in a second predetermined location on the display screen 111 different than the first predetermined location. Using known database or programming techniques, a log of the user communicated personalized messages; images and the like can be created and stored.

All personalized messages (system administrator communicated text and user communicated personalized messages) in the queue may be displayed in a personalized message queue accessible by the system administrator 126. The system administrator 126 can select personalized messages and move them up or down in the queue or remove them from the queue for any reason.

The venue display system 100 and software allow for predetermined system administrator communicated text to appear at predetermined times throughout the video presentation in the second predetermined location 38.

In one embodiment, the system administrator 126 configures how all text looks on the screen including, but not limited to, the font, color, size, back ground color, the speed at which personalized messages appear and stay on the display screen 111. The venue display system 100 and software are configurable to make all the displayed text visually appealing depending on the particular personalized message and theater conditions.

Once the venue display system 100 is set up to meet the requirements of the system administrator 126 for the particular viewing, the set up can be saved and retrieved for another showing.

Client communicated personalized messages can be filtered to control the words displayed on the screen using known filtering techniques. For example, certain inappropriate or offensive words can be prevented from displaying on the display screen. Alternatively, whole comments can be prevented from being displayed on the display screen. Further, only certain letters may be edited such that the complete word is not available, but the gist of the word is still there.

The amount of filtering is adjustable by the system administrator 126. For personalized messages with a "mature third parties" or MA rating, the filtering may be minimal. However, for PG-13 or G showings or for other particular third parties, the filtering may be more extensive.

In one embodiment the venue display system 100 receives the client communicated personalized messages wirelessly through the client's mobile device.

The client communicated personalized messages can be filtered to control the words displayed on the screen using known filtering techniques. For example, certain inappropriate or offensive words can be prevented from displaying on the display screen. Alternatively, whole comments can be prevented from being displayed on the display screen. Further, only certain letters may be edited such that the complete word is not available, but the gist of the word is still there.

The amount of filtering is adjustable by the system administrator 126. The venue display system 100 receives the client communicated personalized messages wirelessly through a client's mobile device. The software processes the incoming client communicated personalized messages.

In one embodiment, the client registers its mobile device.

Figure 7:
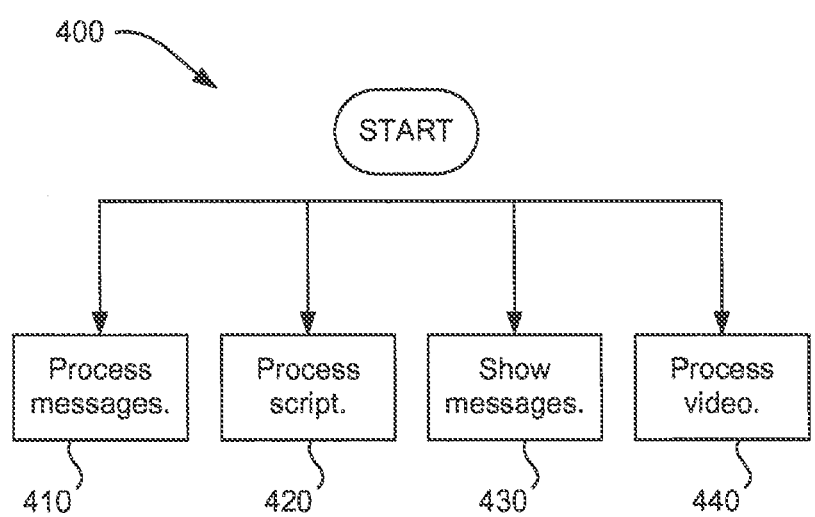
FIG. 7 is a schematic block diagram of a number of parameter sensors located in one of the display venue in one embodiment of the present invention.
Figure 8:
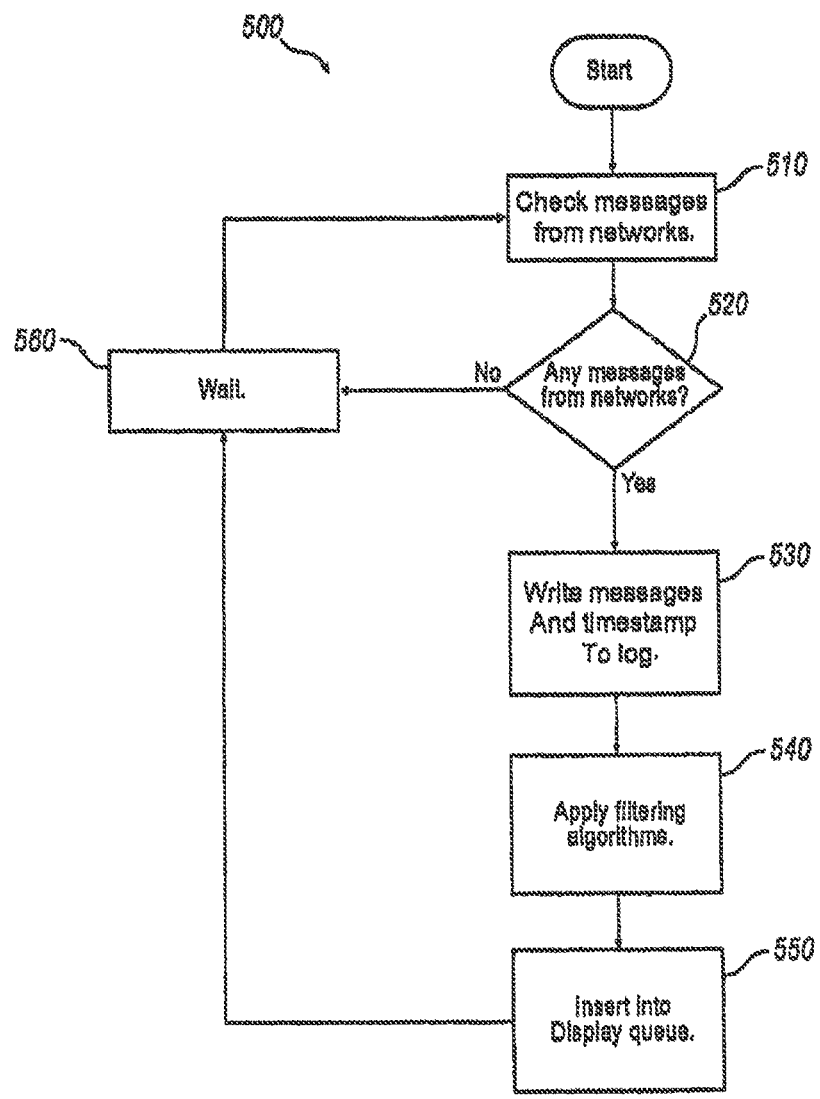
FIG. 8 is a schematic block diagram of components at one of the display venue in one embodiment of the present invention.

In one embodiment of displaying client personalized messages, images, and the like at the display venue 120 is further disclosed in FIG. 8. As illustrated in FIG. 7, the venue display system 100 starts and 4 sub processes depicted as Process Messages, images and the like 410, Process Script 420, Show Messages, images and the like 430, and Process Video 440 are illustrated. Sub processes Process Messages, images and the like 410, Process Script 420, Show Messages, images and the like 430 are described in more detail in 9-11 below. Sub process 440 is any well-known video processing technique.

Figure 9:
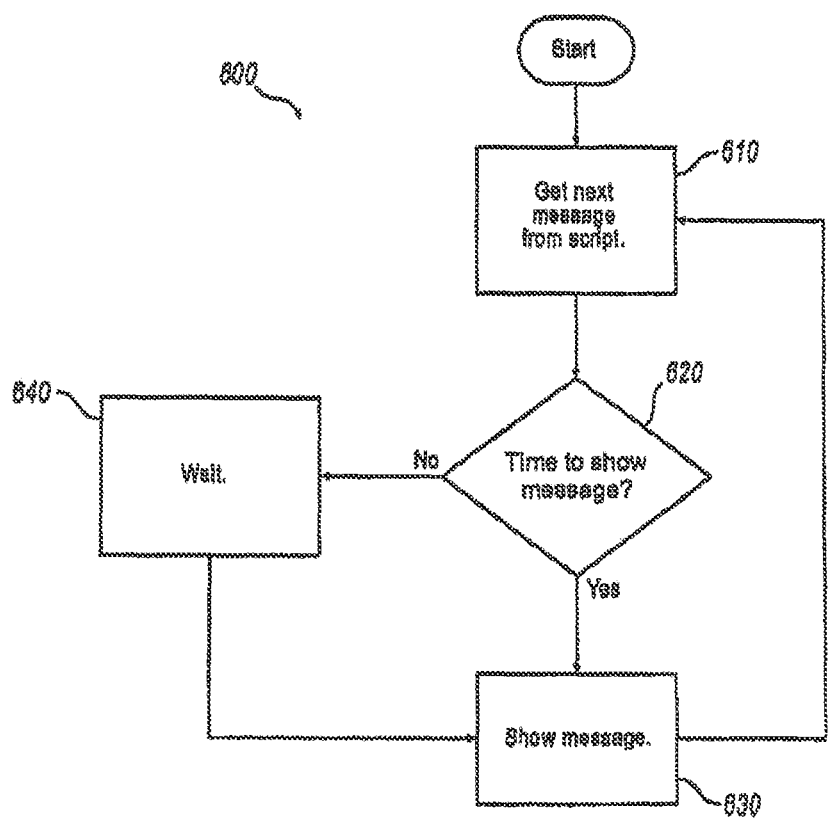
FIG. 9 is a schematic diagram of one display venue together with components for producing interactive media content at a display venue screen.

FIG. 9 illustrates an embodiment of processing client personalized messages, images, and the like. In the first step 510, the venue display system 100 checks to see if their personalized messages. In step 520, if there are personalized messages, the venue display system 100 time stamps and records information into a log. As described above, filtering algorithms are applied in step 540 to maintain the proper level of dialogue. Messages, images and the like are then inserted in a display queue in step 540. The process then repeats itself through step 560 back to step 510. If there are no personalized messages when the venue display system 100 checks in step 520, the venue display system 100 will repeat step 510 through step 560.

Figure 10:
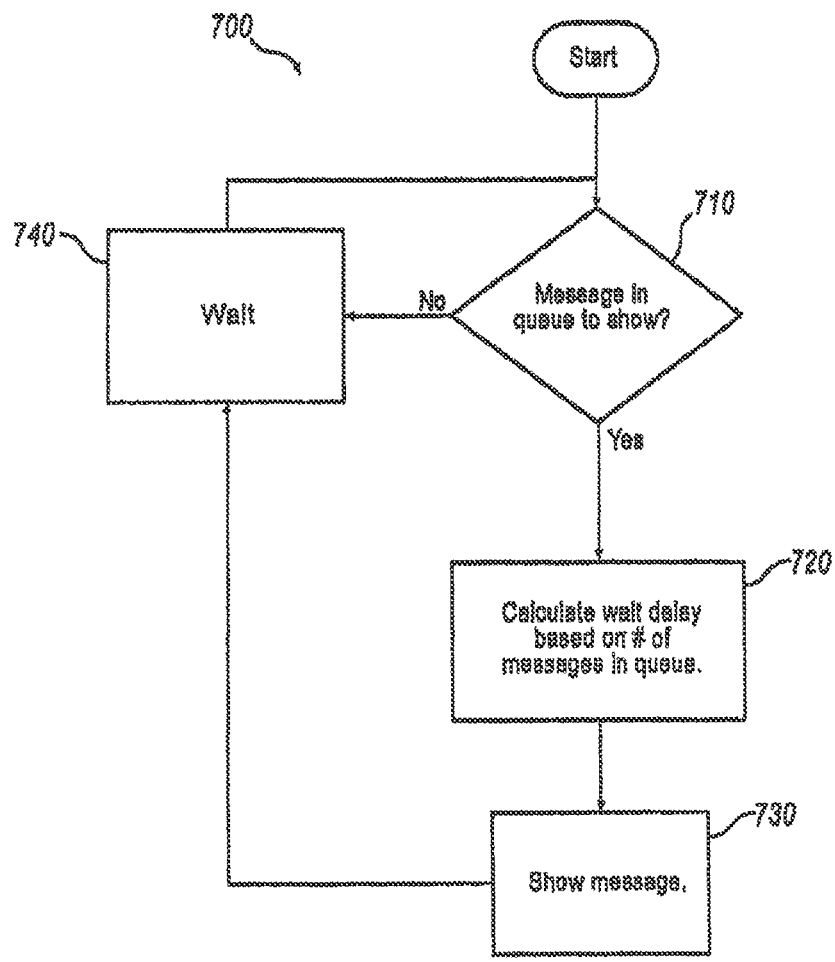
FIG. 10 is a block diagram representing a quiz system interleaved with advertisements.

A flowchart for the processing of processing scripts is depicted in FIG. 10. In step 600, the process script is started. In step 610, the first personalized message from the script is retrieved. The next step 620 determines if it is time to show the personalized message based on timing information entered by the system administrator 126. If it is not time yet, the personalized message is not displayed and the venue display system 100 waits the necessary amount of time as shown in step 640. Once it is time, the personalized message is displayed as shown in step 630 and the process goes back to step 620 to retrieve the next personalized message. If in step 620, it is time to display the next personalized message, the personalized message is shown as in step 630.

Figure 11:
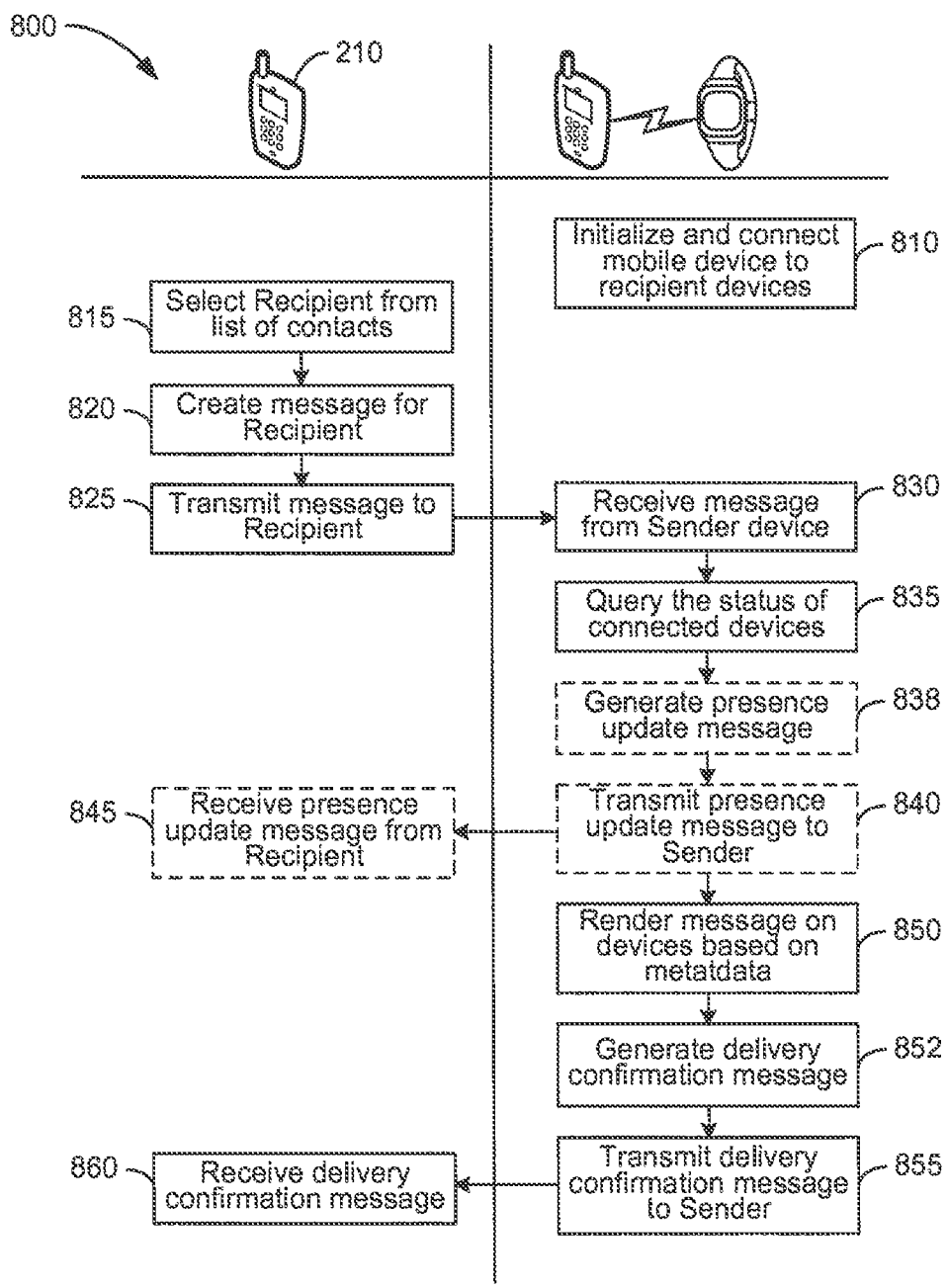
FIG. 11 is a process flow diagram illustrating an embodiment method for sending customization of media contents and receiving the client's status information in one embodiment of the present invention.

A flow chart depicting the show personalized messages flow process is shown in FIG. 11. The process is started in step 700. The venue display system 100 looks in step 710 for a personalized message in the queue. If there is no personalized message, the venue display system 100 waits in step 740 and then starts over in step 710. If there is a personalized message, the venue display system 100 calculates the wait time before the personalized message is displayed based on the number of personalized messages in the queue in step 720. When it is time to show the personalized message, the personalized message is shown in step 730.

Lastly, the personalized message, images and the like are projected or shown on the display screen 111 at the appropriate time using well known techniques.

Figure 12:
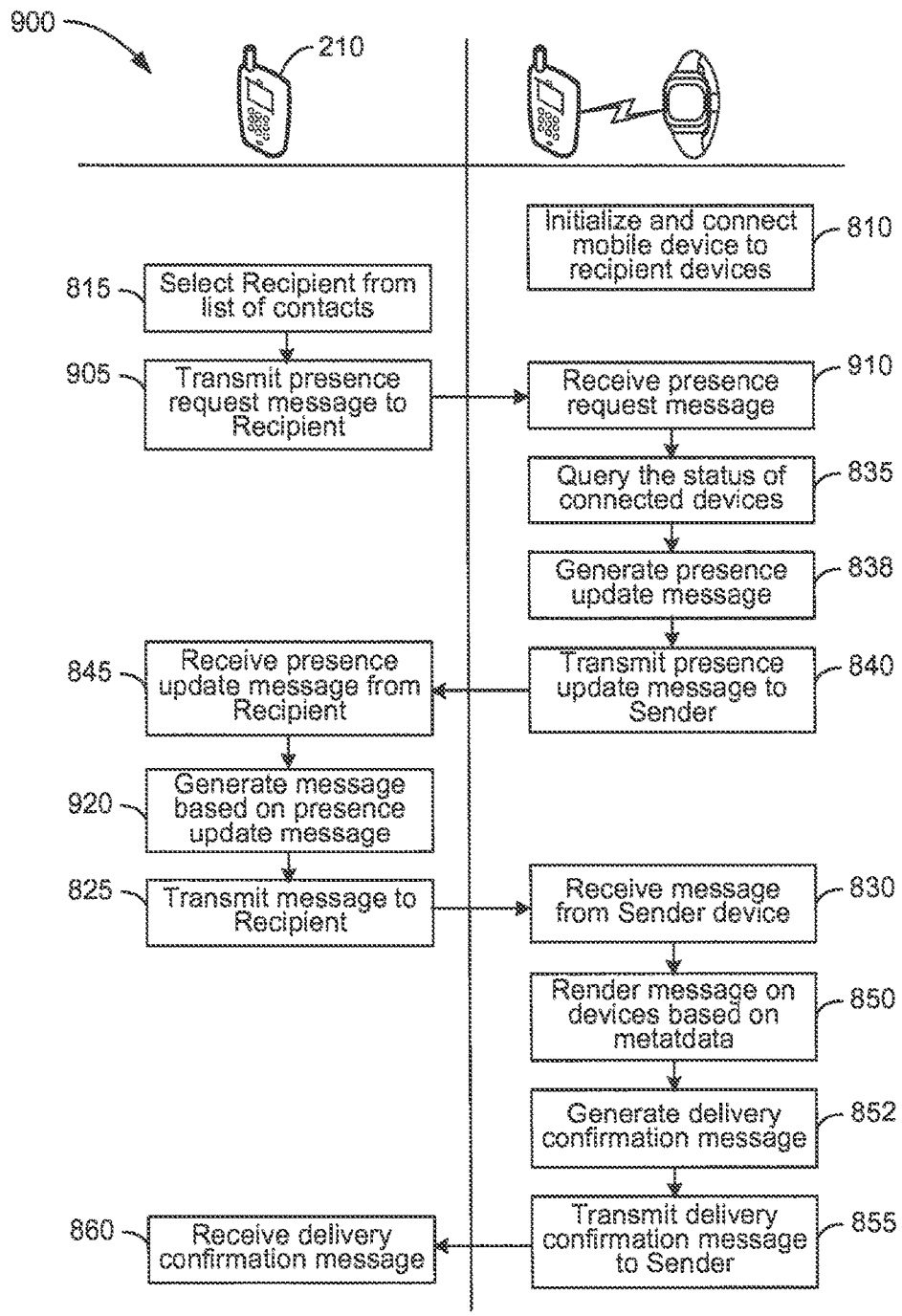
FIG. 12 is a process flow diagram illustrating an embodiment method for directly pulling a client's status information and sending customization of media contents based on the status information in one embodiment of the present invention.

FIG. 12 illustrates one embodiment of methods 200 for sending personalized messages and receiving status information from devices employed by a client. In block 810, a venue display system 100 may be initialized and connected to client devices. For example, the mobile device 106 may be a mobile device that exchanges short-range radio signals with a personal hub 102, which make exchange short-range radio signals with at least one wireless audio device.

In block 815, a client's mobile device 210 may select the client from a list of contacts. For example, the client's mobile device 210 may display a stored list of contacts, such as in an address book database, and receive selection input data from the client, such as by detecting the client's touch on the area of the client's mobile device 210 touch screen that represents a contact name. The client's mobile device 210 may be configured to store and relate contact names with mobile device numbers, fax numbers, email addresses, and other information for establishing communications and/or transmitting personalized messages. In an embodiment, the contact information may be used by the client's mobile device 210 to determine destination addresses for SMS text personalized messages, whisper personalized messages, visual personalized messages, video calls, mobile device calls, data personalized messages, emails, and any other form of communication. In an embodiment, if the client's mobile device 210 maintains multiple contact addresses for the selected client, the client's mobile device 210 may prompt the client to supply further inputs to determine a method of communication with the selected client. For example, the client's mobile device 210 may respond to the selection of the client contact by prompting the client to further select whether to generate an email, an SMS text personalized message, a whisper personalized message, an audio personalized message, a visual personalized message, a video call, or establish a conventional vocal conversation (e.g., a mobile device call).

In an embodiment, the client's mobile device 210 may store and execute software applications or routines that perform the communication services or protocols described above. For example, the client's mobile device 210 may store and execute a whisper app, with which the client's mobile device 210 may receive client input that directs the app to create a whisper personalized message. In an embodiment, the client's mobile device 210 may have an address book, a priority list, and/or a privileged list which stores the contact information for other devices (e.g., mobile devices 210 and personal hubs) which may identify individuals (i.e., contacts) who have included the client in their privileged lists. For example, the client's mobile device 210 may receive a personalized message indicating that the client has been added to a client's privileged list and note that information in the contacts database as someone to which the client can send whisper personalized message transmissions. In another embodiment, the client's mobile device 210 may instead contain a database that stores device contact information to which the client's mobile device 210 may transmit privileged transmissions, such as whisper personalized messages. In an embodiment, the client's mobile device 210 may transmit but not receive privileged communications to a particular client device.

In block 820, the client's mobile device 210 may create a personalized message for the client that was selected in block 815. For example, the client's mobile device 210 may enter an email personalized message creation routine in response to the client selecting the client's email address. The client's mobile device 210 may receive input, such as speech, text, and/or selection of displayed options, and generate a complete personalized message configured to be transmitted to the client's destination address as defined by the selected client information. In block 825, the client's mobile device 210 may transmit the personalized message to the client, for example, to venue display system 100.

In block 830, venue display system 100 may receive the personalized message from the client's mobile device 210. A mail server or mobile device 210 messaging server may push the personalized message to venue display system 100. Alternatively, venue display system 100 may receive an alert that the personalized message is available for download from a remote server.

In block 835, venue display system 100 may query the status of connected devices. For example, venue display system 100 may obtain status information from venue display system 100, personal hub and/or wireless audio devices. In particular, the venue display system 100 may determine device settings by polling the devices to determine configuration settings, such as activity modes and operating parameters. For example, venue display system 100 may determine whether venue display system 100 is in silent mode. Other such device settings venue display system 100 detects may include whether the mobile device 210 is engaged (e.g., an authentication routine is executing that may require user input or password), or whether a vibration mode is engaged. Venue display system 100 may also determine whether there are active connections with the personal hub, nearby laptop computers, and other wireless devices. For example, venue display system 100 may determine whether there are any active data links between venue display system 100 and a hub, including but not limited to Bluetooth® pairings/links, and the like. In an embodiment, the initialization operations in block 810 may be recorded and used by venue display system 100 to indicate status information of the client at a given time.

Venue display system 100 may also determine the status of the client by polling the sensors and the like. In an embodiment, venue display system 100, personal hub 102, and any other devices may store status indicators (i.e., codes) that describe the individual devices' configurations or settings. For example, the personal hub may store a code which describes whether the personal hub has active Bluetooth® connections to other devices, is in a sleep or silent mode, or is currently rendering personalized message data. In an embodiment, the various client devices may store status indicators representing the status of any other device or all client devices.

In optional block 838, venue display system 100 may generate a presence update personalized message. The presence update personalized message may be based on the determined status of venue display system 100, the personal hub 102, and/or other devices associated with the client. The contents of an embodiment of a presence update personalized message are described below with reference to FIG. 15.

In an embodiment, venue display system 100 may create the presence update personalized message in the same form or delivery method as received from the client's mobile device 210 in block 830. For example, if the client's mobile device 210 transmitted an email to the client; venue display system 100 may generate an email presence update personalized message for transmission to the client. In an embodiment, the contents and method of transmission of the presence update personalized message may be determined by user configurations stored within a file on venue display system 100. For example, the client may configure venue display system 100 to only send presence update personalized messages as SMS text personalized messages. In an embodiment, the client may store configurations which prioritize various methods of transmission for the presence update personalized messages and/or use contact information stored within venue display system 100 to determine available methods of transmission for various clients. In an embodiment, the presence update personalized message may contain a natural language summary of the client's status based on the determined status information. For example, the presence update personalized message may contain a text segment which indicates that the client is asleep based on static motion data and regular temperature readings.

In optional block 840, venue display system 100 may transmit the presence update personalized message to the client, for instance to the client's mobile device 210. In an embodiment, venue display system 100 may only transmit the presence update personalized message if the client's mobile device 210 (or its user) has been pre-approved, authenticated, or is a member of a privileged list stored on venue display system 100 or personal hub 102. In an embodiment, venue display system 100 may prompt the client to authorize a transmission of the presence update personalized message. In another embodiment, the presence update personalized message may further contain an indication that confirms that the client is within the client's privileged list.

In optional block 845, the client's mobile device 210 may receive the presence update personalized message from the client, for instance from venue display system 100. In an embodiment, if the client's mobile device 210 executes a whisper application (or app), the client's mobile device 210 may execute routines to parse the presence update personalized message and identify certain formatting information for rendering the presence update personalized message. For example, the presence update personalized message may contain header information which describes categorizations of the client's status and the status of the client's personal hub (e.g., whether it is currently worn and recently used) and the wireless audio devices (e.g., whether they are currently on the client's ears). In an embodiment, the client's mobile device 210 may detect information within the presence update personalized message indicating that the client is within the client's privileged list. For example, there may be a code that indicates the client has a favored status with the client. In an embodiment, the client's mobile device 210 may render the presence update personalized message as text, a graphical display, audio, or a combination of these.

In block 850, the client's personalized message, which was received in block 830, may be rendered on one or more devices. For example, venue display system 100 may display a downloaded email personalized message from the client. As another example, the personal hub 102 may play an audio file attached to the client's personalized message through a wireless audio device. In various embodiments, the client's personalized message may contain metadata indicating rendering instructions which venue display system 100 may obtain by decoding and/or parsing the client's personalized message. In an embodiment, the client's mobile device 210 may utilize a whisper app to generate such instructions. The application and/or use of metadata within personalized messages are described detail in below with reference to FIGS. 16-17.

In block 852, venue display system 100 may generate a delivery confirmation message. The delivery confirmation message may be based on the manner in which the client's personalized message was presented to the user as well as any use of personalized message by the client's devices, such as venue display system 100 or personal hub 102. Venue display system 100 may monitor and record every access, modification, and exchange related to the client's personalized message, creating a data trail of the personalized message through the client's devices. For example, venue display system 100 may record whether the client sees, reads, or hears a personalized message as well as whether the client saves a draft response to a whisper personalized message or an SMS text personalized message. As another example, venue display system 100 may record the identity of the output devices (e.g., the personal hub 102, audio devices, etc.) that render a received whisper personalized message or SMS text personalized message. In an embodiment, venue display system 100 may log the timestamp information for each received personalized message, the time and identity of the destination device (or output device) for any transmission of the personalized message or its associated content between venue display system 100, the personal hub 102, and any other connected wireless devices, and the software on the respective devices which rendered, displayed, performed, or otherwise accessed the personalized message and/or its associated content. For example, venue display system 100 may log that the client personalized message was delivered to venue display system 100 from a remote message server at a particular time and that it was transmitted to the personal hub 102 where it displayed as text on the display unit. The delivery confirmation messages may also report the manner in which the received personalized message was delivered by including an indicator of whether personalized message contents were successfully rendered by output devices and/or an indicator of whether personalized message contents of the received personalized message were queued for rendering by output devices.

In an embodiment, the delivery confirmation message may contain information indicating the manner in which the personalized message was delivered to the client including the output devices that displayed or played the personalized message, such as the venue display system 100, audio device or personal hub. For example, the delivery confirmation message may state that the client's audio personalized message was played through two wireless audio devices. In an embodiment, the delivery confirmation message may contain similar information as the presence update message.

In an embodiment, either venue display system 100 or the client's mobile device 210 may process delivery confirmation information to determine the likelihood that the client accessed or played the client's personalized message. For example, venue display system 100 may evaluate logged timestamps, access reports, and device status to interpret if the client played an audio file. As another example, the client's mobile device 210 may receive and process the delivery confirmation message to determine the likelihood. The determined likelihood may be expressed within the delivery confirmation message as a probability, a natural language summary, or any other manner of representing venue display system 100 evaluation. In an embodiment, the likelihood evaluation may be conducted by a whisper app running on either of the devices 210.

In block 855, venue display system 100 may transmit the delivery confirmation message to the client's mobile device 210. In block 860, the client's mobile device 210 may receive the delivery confirmation message, which was transmitted in block 855. In an embodiment, the client's mobile device 210 may process and render the contents of the delivery confirmation message as graphical indicators in a messaging application. For example, the client's mobile device 210 may receive and process the delivery confirmation message and draw a prompt on the display unit informing the client that the client's personalized message was delivered and opened by the client including displaying an icon of the device that rendered the personalized message.

Figure 13:
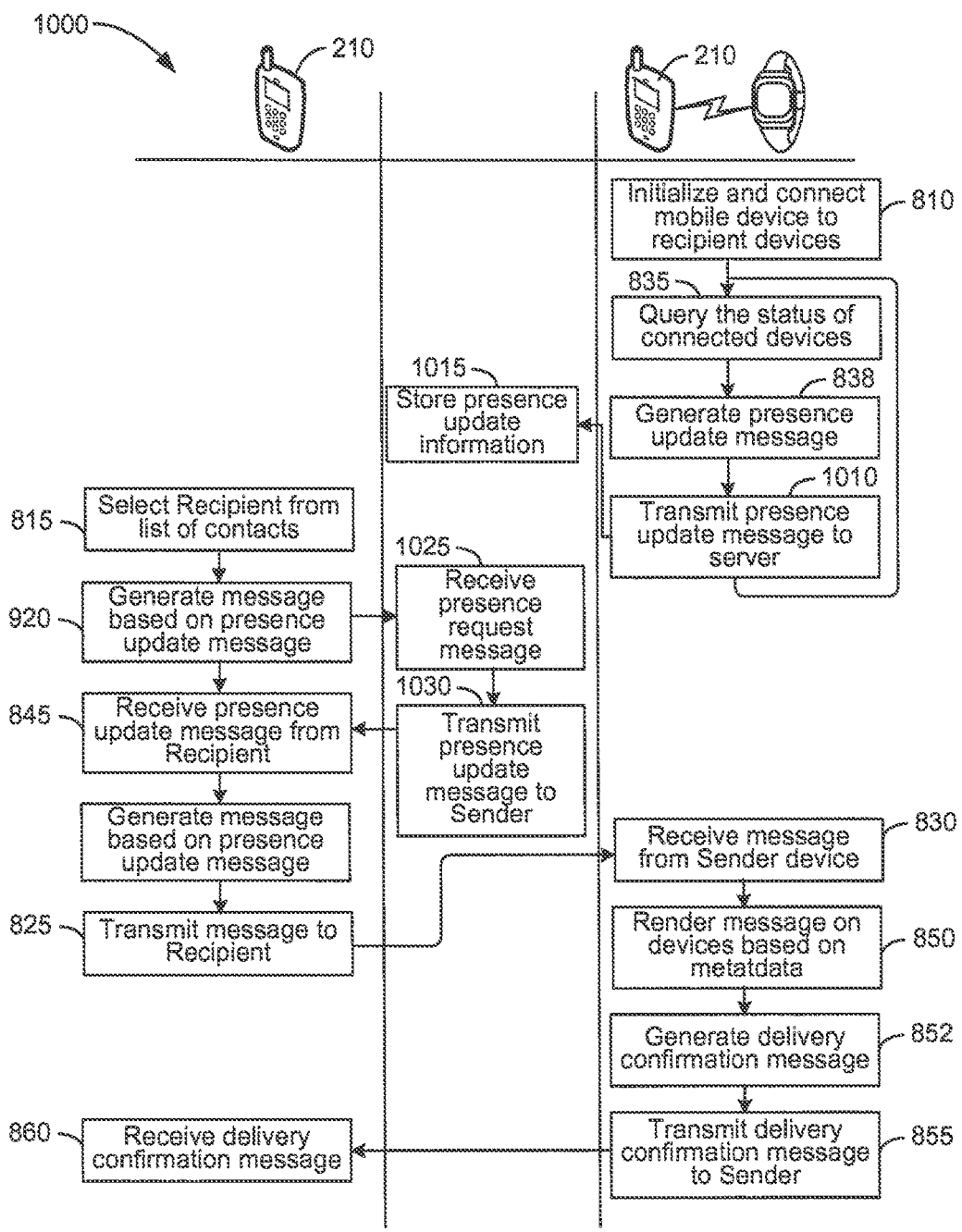
FIG. 13 is a process flow diagram illustrating an embodiment method for retrieving a client's status information from a server, transportation management system TMS and equivalent, and sending customization of media contents based on the status information in one embodiment of the present invention.

FIG. 13 illustrates an embodiment method 900 for directly pulling a client's status information and sending personalized messages based on the status information. The method 900 is similar to the method 800 described above, however here a client's mobile device 210 may retrieve status information describing a client's devices' status and generate personalized messages having formatting based on the status information.

In block 905, the client's mobile device 210 may transmit a presence request message to the client who was selected in block 815. In an embodiment, the presence request message may include a predefined system call, an API command, or any other software command that venue display system 100 may interpret as a request to query devices. In an embodiment, the presence request message may simply include email, SMS text, whisper message content, or audio content that indicates the client's desire to obtain the client's status information. For example, venue display system 100 may recognize a presence request in response to receiving an email from the client that asks "what's your status?" In another embodiment, the client's mobile device 210 may transmit a presence request message after receiving client input on the client's mobile device 210. For example, the client's mobile device 210 may send a presence request message in response to detecting a user click on a graphical user interface button beside the client's name in a contact list. In another embodiment, the client's mobile device 210 may execute background routines that periodically transmit presence request messages for some or all contacts within a stored contact list. For example, the client's mobile device 210 may automatically send presence request messages to some or all contacts stored within a whisper privileged list located on the client's mobile device 210. In another embodiment, the client's mobile device 210 may transmit a presence request message while the client composes a personalized message or immediately before sending a personalized message.

In block 910, venue display system 100 may receive the presence request message. Venue display system 100 may determine that the personalized message is a presence request by evaluating any metadata (e.g., header information), by conducting text analysis, or by any other means of classifying received personalized message data. In block 835, venue display system 100 may query the status of connected devices. In block 838, venue display system 100 may generate a presence update message. In block 840, venue display system 100 may transmit the presence update message to the client's mobile device 210. In block 845, the client's mobile device 210 may receive the presence update message from the client, for instance from venue display system 100.

Figure 16:
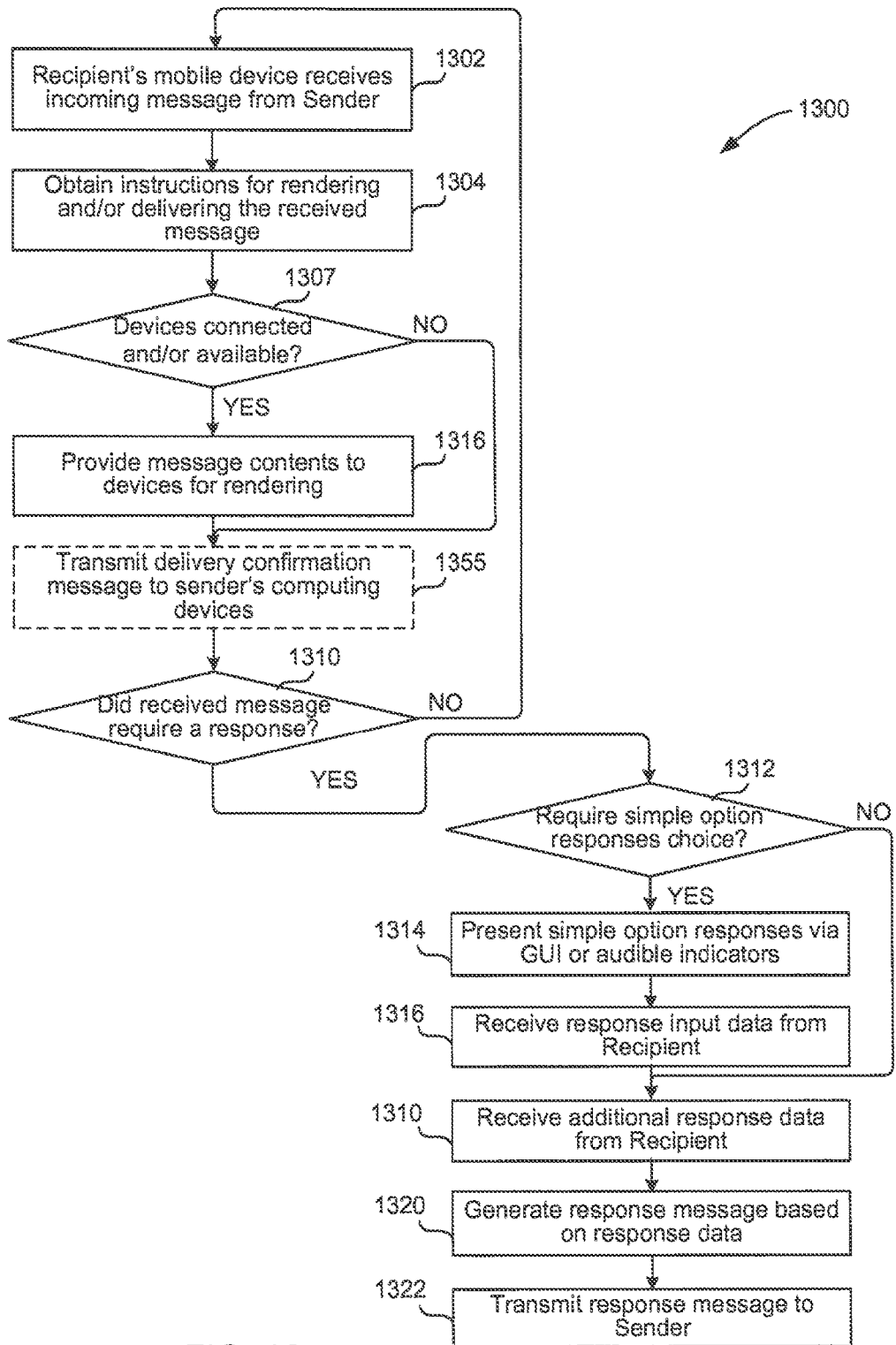
FIG. 16 is a process flow diagram illustrating an embodiment method for a client receiving, rendering and responding to a customization of media content formatted based on the user's status information in one embodiment of the present invention.

In block 920, the client's mobile device 210 may generate a personalized message based on the presence update message received from the client in block 845. For example, the client's mobile device 210 may generate a whisper message to the client based on the contents of the received presence update message. In an embodiment, a whisper application (or app) executing on the client's mobile device 210 may parse the presence update message to determine formatting techniques or other personalized message configurations that may capitalize on the client's current status (e.g., does the client have wireless audio devices equipped, is venue display system 100 in silent mode, etc.). FIG. 16 describes in detail how the client's mobile device 210 may use the status information in creating personalized messages.

In block 825, the client's mobile device 210 may transmit the personalized message to the client, for example, to venue display system 100. In block 830, venue display system 100 may receive the personalized message from the client's mobile device 210. In block 850, the client's personalized message, which was received in block 830, may be rendered on one or more devices based on metadata. In block 852, venue display system 100 may generate a delivery confirmation message. In block 855, venue display system 100 may transmit the delivery confirmation message to the client. In block 860, the client's mobile device 210 may receive the delivery confirmation message.

Figure 14:
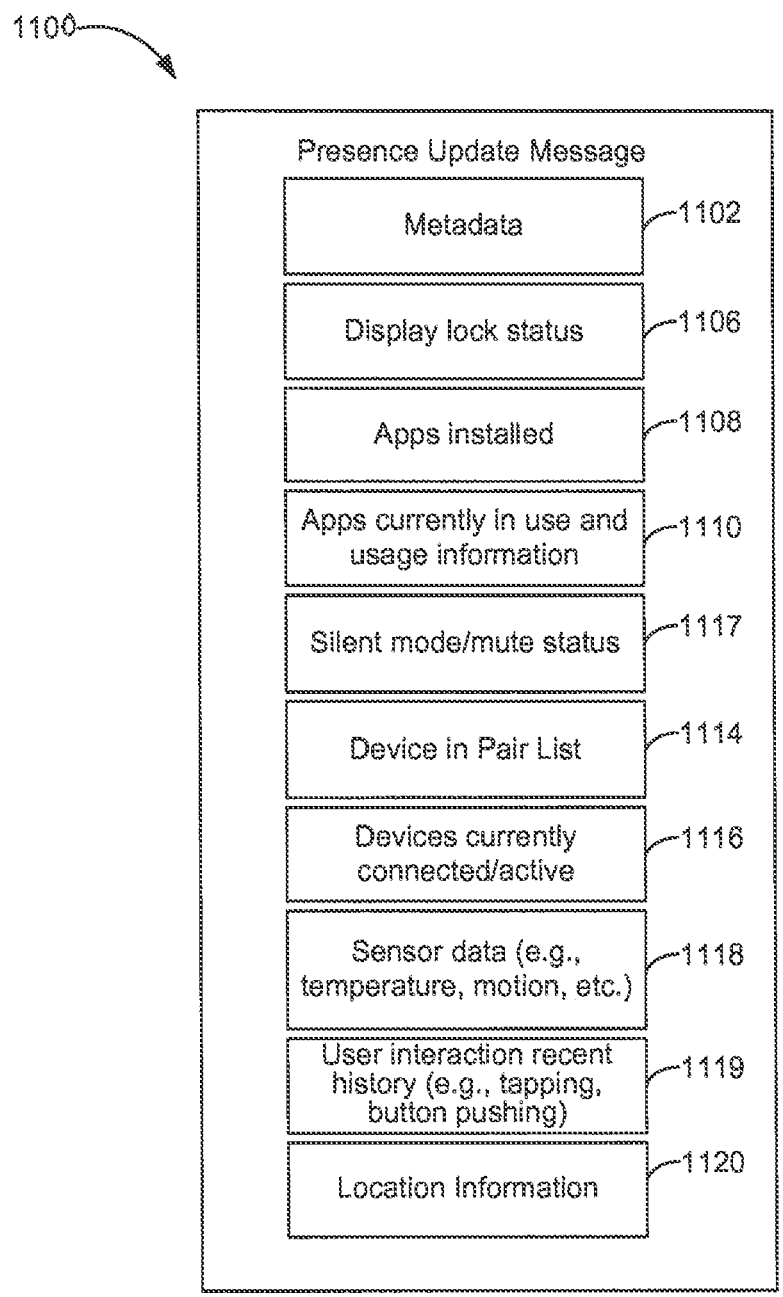
FIG. 14 is a data structure diagram illustrating potential elements of a presence update customization of media content in one embodiment of the present invention.

FIG. 14 illustrates an embodiment method 100 that employs a server 1001 to store status information. Unlike in the operations in blocks 905-840 in FIG. 13, the client's mobile device 210 may not receive presence update information from venue display system 100, but instead receive that information from the server 1001. In block 810, venue display system 100 may be initialized and connected to client devices. In block 835, venue display system 100 may query the status of connected devices. In block 838, venue display system 100 may generate a presence update message. In block 1200, venue display system 100 may transmit the presence update message to the server 1001. Venue display system 100 may repeatedly perform the operations in blocks 835-910 as an operational loop. In an embodiment, venue display system 100 may transmit presence status update messages to the server 1001 at a predefined frequency. For example, a regular report from venue display system 100 may provide a real-time (or "heartbeat") presence assessment that the server 1001 may maintain. In an embodiment, venue display system 100 may automatically transmit presence update messages to the contact within a privilege contact list.

In block 1205, the server 1001 may store presence update information. For example, the server 1001 may store presence update information indicated within presence update messages, which were transmitted by venue display system 100 in block 1200. In an embodiment, the server 1001 may record status information within a relational database and may store subsets of the status information within the presence update message. In an embodiment, the server 1001 may update database values in response to receiving the presence update message or, alternatively, may log some or all status information over time. In an embodiment, the server 1001 may generate statistical information describing the status information over time. For example, the server 1001 may calculate the percentage of time venue display system 100 is in silent mode, or how often venue display system 100 is connected to a personal hub 102. As another example, the server 1001 may track motion data represented in the presence update message and estimate typical motion values based on time of day.

The remainder of method 100 is similar to the operations in method 900. However, in blocks 1020-1030, the client's mobile device 210 requests and receives presence update messages from the server 1001 instead of directly from venue display system 100. In block 815, the client's mobile device 210 may select the client from a list of contacts. In block 1020, the client's mobile device 210, may transmit a presence request message to the server 1001. In block 1025, the server 1001 may receive the presence request message. In block 1030, the server 1001 may transmit a presence update message to the client's mobile device 210. In block 845', the client's mobile device 210 may receive the presence update message from the server 1001. In block 920, the client's mobile device 210 may generate a personalized message based on the presence update message. In block 825, the client's mobile device 210 may transmit the personalized message to the client, for example, to venue display system 100.

In block 830, venue display system 100 may receive the personalized message from the client's mobile device 210. In block 850, the client's personalized message, which was received in block 830, may be rendered on one or more devices based on metadata. In block 852, venue display system 100 may generate a delivery confirmation message. In block 855, venue display system 100 may transmit the delivery confirmation message to the client's mobile device 210. In block 860, the client's mobile device 210 may receive the delivery confirmation message.

Figure 15:
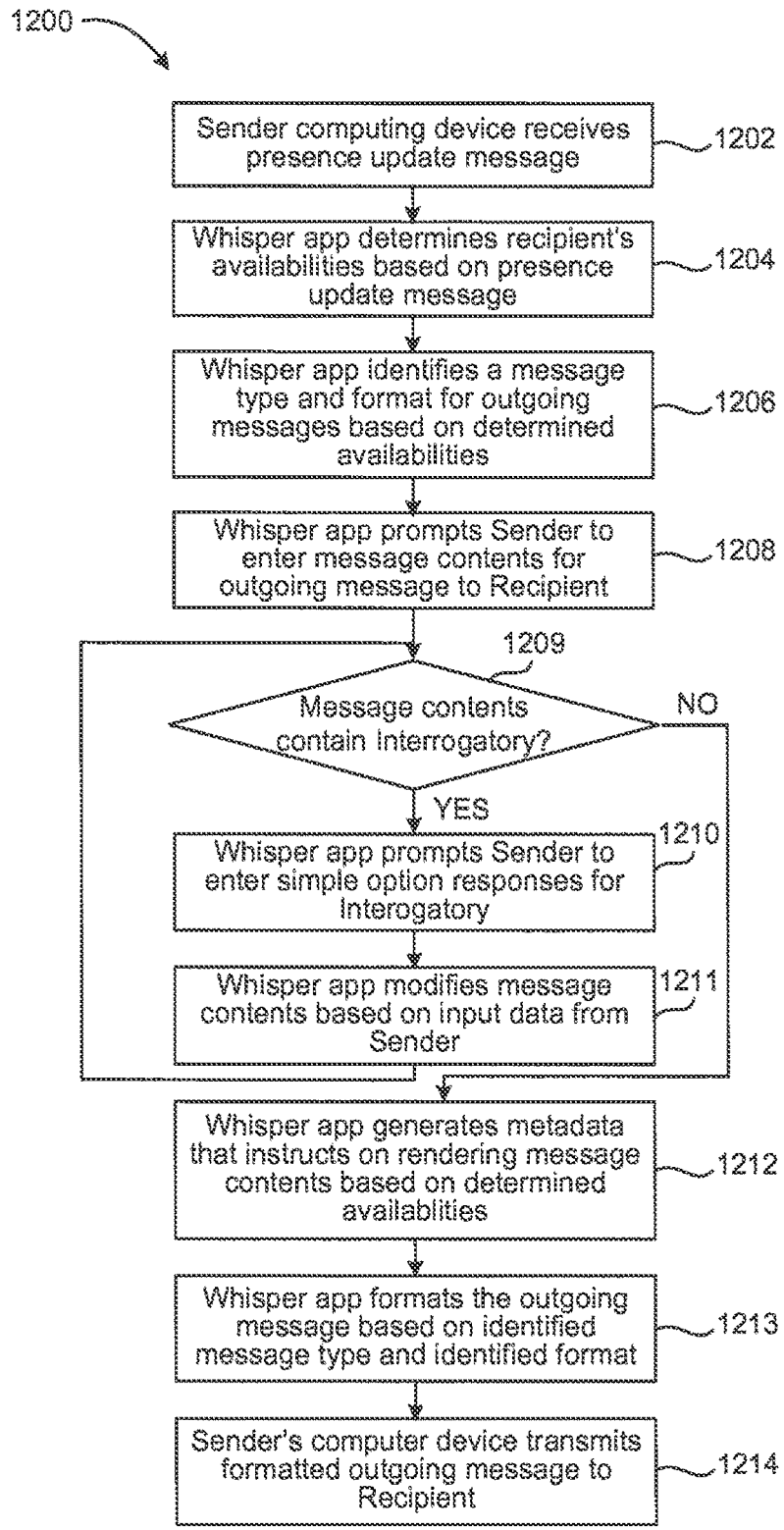
FIG. 15 is a process flow diagram illustrating an embodiment method for generating and formatting a customization of media content based on the client's status information in one embodiment of the present invention.

FIG. 15 illustrates an embodiment data structure within a presence update message 1100. The presence update message 1100 may be transmitted by the venue display system 100 to a client's mobile device or a server maintaining up-to-date status information. The presence update message 1100 may contain metadata 1102, such as formatting information to assist in the rendering using a whisper app. In an embodiment, the metadata 1102 may instruct the client's mobile device to display the status information using particular devices. For example, the metadata 1102 may direct the mobile device to execute a text-to-speech conversion routine and generate an audio file that may be performed through the client's personal hub and connected wireless audio device. In an embodiment, the metadata 1102 may provide whisper app instructions that direct the software running on the client's mobile device to adjust system or software variables based on the presence update message 1100 contents. For example, the metadata 1102 may instruct a whisper app to change default settings for generating new personalized messages.

The presence update message 1100 may also contain numerous descriptions of the venue display system 100's status at the time the presence update message 1100 was created, such as display status 1104, a list of some or all apps installed 1106 on the client's mobile device, a list of the apps currently in use and usage information 1108 on the client's mobile device, and silent mode/mute status 1110. The presence update message 1100 may further include application data describing the client's use of particular applications. For example, the presence update message 1100 may contain browser history reports, data entered into online forms, or cookie information.

The presence update message 1100 may contain data regarding the various devices associated with the venue display system 100, such as a list of some or all devices in a pair list 1112 (e.g., devices which have been Bluetooth® paired with the client's mobile device). In an embodiment, the presence update message 1100 may list some or all of the devices with which the client's mobile device has ever paired. The presence update message 1100 may contain a list of the devices that are currently connected or active 1114, such as a connected personal hub and wireless audio device. This list may contain information regarding devices that are connected via wired or wireless (e.g., short-range radio) connections. For example, the presence update message 1100 may indicate whether wired headphones (or wired headsets or audio devices) are connected to the personal hub or other associated devices.

The various connections between the venue display system 100 and the associated devices may be indicated in the presence update message 1100. For example, the presence update message 1100 may indicate that a mobile device is connected via a wire or short-range radio connection to a close personal computer (e.g., a laptop). In general, the connected status of the various devices may indicate the devices' availabilities. For example, when the personal hub is active and wirelessly paired or connected with the venue display system 100 (e.g., mobile device); the personal hub may be available. In an embodiment, the presence update message 1100 may indicate whether any of the associated devices (e.g., personal hub, mobile devices, wireless audio devices, wired headset and the like) are connected to a power source (e.g., an AC adapter) and/or are being charged. The presence update message 1100 may describe the power status of the batteries within the associated devices and may report if a battery within any associated device is "dead". For example, the presence update message 1100 may indicate that the personal hub battery is almost out of power. Further information may include sensor data 1116, such as temperature data and/or motion data. The sensor data 1116 may be retrieved from sensor or measurement units located within the mobile device, personal hub, and wireless audio devices. For example, the venue display system 100 may retrieve motion data from a connected wireless audio device containing a gyroscope. As another example, the sensor data 1116 may represent motion data from an accelerometer and body temperature measurements from a temperature sensor, both sensors contained within the personal hub. The sensor data 1116 may also include temperature measurements from the wireless audio devices which may be used to determine whether the wireless audio devices are being worn. In an embodiment, the presence update message 1100 may indicate possible reasons why devices are not being worn, such as indicating that the devices are currently being powered (or charged) via a connection to a power source, are currently malfunctioning (e.g., report software error codes), or redundant because other connected devices are being worn by the user (e.g., wireless audio devices are not worn because a wired headset is connected to the personal hub).

The presence update message 1100 may also include data describing the client's user interaction recent history 1118 with the venue display system 100. This user interaction recent history 1118 data may include information about the venue display system 100's data usage, such as records of data uploaded/downloaded by the mobile device over a period of time, recently used applications, and inputs within various applications (e.g., tapping on a touch screen, pushing device buttons, etc.). For example, the presence update message 1100 may include a report of the timestamps of the recent taps on the touch screen.

The presence update message 1100 may contain location (or position) information 1120 about the client, such as GPS coordinates retrieved from a GPS unit within the mobile device. In an embodiment, other data describing the location of the client or used to determine a location may be included in the presence update message 1100, and may include mobile device tower information (e.g., access records and tower identification information), WiFi access information (e.g., router log information), and IP addresses of the various client devices. In an embodiment, the venue display system 100 may store the presence update message 1100 and append the message to other transmissions. For example, the mobile device may insert the information within the presence update message 1100 into a delivery confirmation message.

In an embodiment, the presence update message 1100 may include information describing the client's schedule or itinerary. For example, the venue display system 100 may access calendar data, stored on the mobile device 210 or in an accessible online account (e.g., Google calendar, Outlook calendar, etc.), and append the client's current activity to the presence update message 1100. In an embodiment, the presence update message may contain information about the venue display system 100 current cellular Network Systems data rate, connectivity to WiFi Network Systems 110, and any other indicators of data streaming or telephonic availability. In another embodiment, the presence update message 1100 may contain information describing the client's relationship or privileged status with respect to the client. The venue display system 100 may determine the privileged status (e.g., the client is within the client's privileged list, "known," "preferred," "liked," etc.) of the client (or the client's mobile device) by comparing the client's 10 against data stored within a contact information database, social network accounts/databases, or other sources that may contain information about the relationship between the client and the client. For example, the presence update message 1100 may include an indicator of whether or not the client is on the client's privileged contact list and thereby able to create whisper messages that the client's personal hub may render immediately upon receipt. As another example, the presence update message 1100 may describe the client's current disposition regarding the client and include text such as, "Recipient is not taking your calls at the moment" or "You have been removed from Recipient's favorites list."

Figure 17:
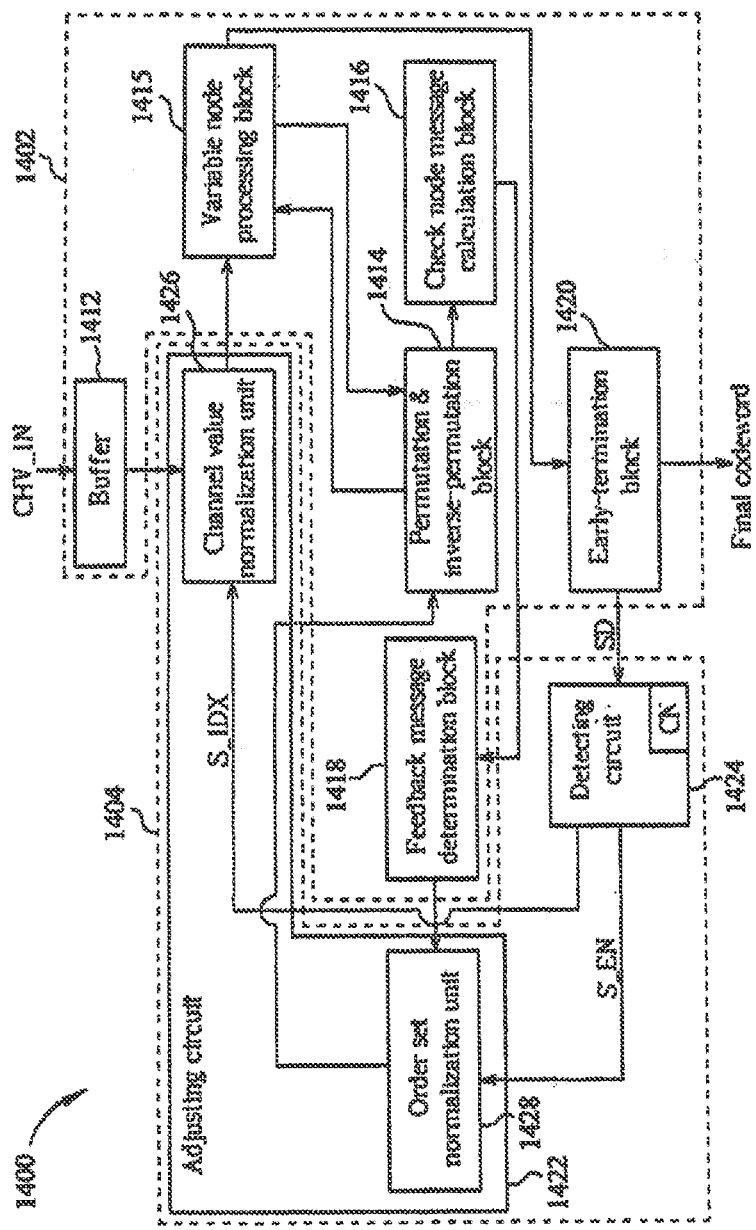
FIG. 17 is a block diagram illustrating a decoding apparatus according to an exemplary embodiment of the present invention.

FIGS. 16-17 illustrate various embodiment methods for generating an outgoing personalized message that includes instructions for rendering personalized message contents on a venue display system 100. In the various embodiments, the operations may be performed by various communication devices, such as the devices within the communication system as described above with reference to Figure (e.g., a mobile device) as well as other mobile devices capable of generating personalized messages for delivery to a venue display system 100, such as a laptop computer, a central server, and various other mobile devices associated with a client.

An embodiment method may include determining, based on received status information regarding the venue display system 100, availabilities of message rendering devices coupled to the venue display system 100, identifying a format and a personalized message type for sending the outgoing personalized message to the venue display system 100 based on the determined availabilities of personalized message rendering devices coupled to the venue display system 100, formatting the outgoing personalized message according to the identified format and the identified personalized message type, generating metadata that includes instructions for rendering the outgoing personalized message based on the determined availabilities of personalized message rendering devices coupled to the venue's system, and transmitting the outgoing personalized message to the venue display system 100. In another embodiment, the status information regarding the venue display system 100 may include at least one of information describing a privileged status, a list of devices connected to the venue display system 100, information about recent activities of devices connected to the venue display system 100, and sensor data. In another embodiment, the identified personalized message type may be selected from a group that may include of an email, a whisper message, an SMS text message, an audio message, a visual message, a video call, a mobile device call, and a message formatted for processing with whisper service software. In another embodiment, the generated metadata that includes instructions for rendering the outgoing personalized message may indicate a device coupled to the venue display system 100 on which the outgoing personalized message is to be rendered and whether the outgoing personalized message is to be rendered audibly, visually, or tactilely. In another embodiment, the generated metadata that includes instructions for rendering the outgoing personalized message may indicate that a first portion of the outgoing personalized message is to be rendered on a first device connected to the venue display system 100 and a second portion of the outgoing personalized message is to be rendered on a second device connected to the venue display system 100. In another embodiment, the generated metadata that includes instructions for rendering the outgoing personalized message may indicate that a first portion of the outgoing personalized message is to be rendered audibly via a first device connected to the venue display system 100 and a second portion of the outgoing personalized message is to be rendered visually on a second device connected to the venue display system 100.

In another embodiment, the generated metadata that includes instructions for rendering the outgoing personalized message may indicate that a vibration motor should be activated when rendering the outgoing personalized message. In another embodiment, identifying a format and a message type for sending the outgoing personalized message to the venue display system 100 may be include determining whether the outgoing personalized message includes an interrogatory posed by a client, prompting the client to provide a set of client responses related to the interrogatory when the outgoing personalized message includes the interrogatory, and modifying the outgoing personalized message to include the set of client responses based on an input received from the client.

In another embodiment, generating metadata that includes instructions for rendering the outgoing personalized message based on the determined availabilities of message rendering devices coupled to the venue display system 100 may include generating metadata that indicates that each response in the set of client responses is to be rendered differently. In another embodiment, generating metadata that includes instructions for rendering the outgoing personalized message based on the determined availabilities of personalized message rendering devices coupled to the venue display system 100 may include generating metadata that includes instructions for rendering the set of client responses using at least one of large text, small text, colored text, blinking text, animated text, sound rendered on a device coupled to the venue display system 100, an image rendered on a device coupled to the venue display system 100, and information defined within a configuration file.

FIG. 16 illustrates an embodiment method 1200 for a client's mobile device to create formatted personalized messages based on a client's status information. As described above, in various embodiments the client's mobile device, such as a mobile device or laptop computer, may request presence update messages directly from the venue display system 100 or a server maintaining status information for the venue display system 100. The client's mobile device may execute a whisper app (or whisper software services) and, based on status information indicated in presence update messages, may generate messages that direct the venue display system 100 and associated devices (e.g., personal hub, wireless audio device, etc.) to render the personalized messages in a convenient and effective manner. In various embodiments, the whisper app may be installed and the operations in method 1200 may be performed by the client's mobile device or any other mobile device wired or wirelessly connected to the phone, such as a personal hub, a laptop computer, a wireless audio device, a tablet device, etc.

In block 1202, the client's mobile device may receive a presence update message. For example, the client's mobile device may receive a presence update message that includes status information of devices currently connected to the client's smartphone. In block 1204, the whisper app may determine the client's availabilities based on status information in the presence update message. In other words, the whisper app may create availability conclusions that indicate the availability of devices associated with the client to render message contents. For example, the whisper app, running on the processor of the client's mobile device, may interpret presence or status information indicated within the received presence update message and may determine availabilities of the client. Availabilities (or availability conclusions) may be codes, classifications, or categories that define the ability of the client to receive and interact with various forms of communications (i.e., status information). In particular, the availabilities may be based on the connectivity of the client's devices (e.g., personal hub, wireless audio devices, etc.) For example, the whisper app may conclude that the client is fully available for an interactive audio personalized message, as the client's mobile device browser app is active and his personal hub and wireless audio device are both connected. As another example, the whisper app may conclude that the client has limited availability, as his wireless audio device microphone is configured to a mute setting, but his personal hub is active. As another example, the status information may indicate that the client is within a privileged list of the client's and may transmit whisper personalized messages.

The whisper app may parse the presence update message into discrete data elements and evaluate the variables singularly or in combination. For example, the whisper app may interpret motion data reported from an accelerometer within a personal hub of the client and conclude that the client is active. As another example, the whisper app may conclude that the client is asleep based on static motion data, a report that the personal hub and a wireless audio device are equipped, and an active screen saver application on the venue display system 100, and data use records that show no use for a long period. In an embodiment, the whisper app may determine availabilities (or availability conclusions) based on a rule-based system that may or may not use dependency relationships between various presence variables.

In an embodiment, the whisper app may weigh certain presence variables differently than others when determining availabilities. For example, motion data from the client's personal hub may be weighed as more important than the activity of a phone display lock. In an embodiment, the whisper app may utilize client configuration files to determine the weight or importance of various presence variables. In an embodiment, the whisper app may utilize threshold variables and/or values to determine the client's availability. For example, the whisper app may only determine the client is fully available if motion data retrieved from the venue display system 100 accelerometer represents moderate activity.

In an embodiment, the presence update message may contain client availability conclusions conducted by whisper app services on the venue display system 100 prior to transmission of the presence update message. For example, the venue display system 100 may evaluate the client's various devices, determine presence variables, and conclude that the client has low availability as he is in a meeting.

In block 1206, the whisper app may identify a message type and format for outgoing personalized messages based on the determined availabilities. For example, the whisper app may identify a certain message format and/or message type recommended to be used for personalized messages to the client based on availability conclusions. In an embodiment, based on the availabilities, the whisper app may identify (or recommend) a particular type of transmission. For example, the whisper app may suggest that the client is most available to receive an SMS message as the client's personal hub is not currently connected to the client's mobile device. The whisper app may identify and/or recommend other message types, such as email, whisper messages, SMS text messages, audio messages, visual messages, video calls, mobile device calls, and messages formatted for processing with whisper service software. The whisper app may also identify a recommended message format or content guidelines for transmissions based on the determined availabilities. For example, as the client has limited data availability due to a low reported data rate, the whisper app may identify that the client should transmit a short text instead of an email with large attachments.

In an embodiment, the whisper app may render a graphical dialog window on the client's mobile device which displays identified message and format recommendations. In another embodiment, the whisper app may allow the client to accept or reject recommendations. For example, the client may not choose to follow the whisper app's identified recommended message type of a whisper message instead of an email message. In an embodiment, the whisper app may automatically impose formatting and message type limitations on the client based on the determined availabilities. For example, after interpreting the client's availability as minimal due to a reported calendar entry of a meeting at the current time and a client status message of "Do Not Disturb," the whisper app may disallow the creation of a whisper audio message.

In an embodiment, if the client desires to transmit a personalized message including an interrogatory (or question) for the client, the whisper app may identify formatting for rendering the personalized message as a selection list. For example, if the determined availabilities describe the client as unable to provide a long response, the whisper app may prompt the client to create a simple question message with a set of responses from which the client may choose using his mobile device, personal hub, or other connected devices, such as wireless audio devices. In an embodiment, the whisper app may prompt the client to input whether a transmission requires a binary response from the client (i.e., 'yes' or 'no'). In an embodiment, the whisper app may prompt the client to provide other formatting aspects to personalized messages, such as optional text effects (e.g., small text, large text, blinking text, animated text, bold text, colored text, etc.), whether a response is audible (e.g., a sound response), and whether a response is to be rendered from a particular output device associated with the venue display system 100 (e.g., a visual response displayed on the client's personal hub, an audible response rendered on an audio device, etc.). In an embodiment, the whisper app may prompt the client to use a predefined or template format for the personalized message (e.g., a format or other information defined within a configuration file or user preference file).

In block 1208, the whisper app may prompt the client to enter personalized message contents for an outgoing personalized message to the client. For example, the client may provide personalized message contents, such as statements, comments, and interrogatories (or questions). In an embodiment, the whisper app may render a series of questions to the client on the client's mobile device which prompts the client to enter information. For example, the whisper app may display questions, such as "Do you want to make a statement or pose a question to the client?" The whisper app may render graphical user interface buttons with which the client may interact to proceed through the app's prompts. In an embodiment, the whisper app may open new applications for personalized message contents input by the client based on responses to prompts. For example, the whisper app may indicate that the client is best available on email or SMS text, provide the client with a GUI button for each, and open either an email composition form or SMS text form based on the client's input.

In an embodiment, the whisper app may evaluate the personalized message contents and determine the likelihood that the client will be available based on the determined availabilities (e.g., availability conclusions and status information). For example, the whisper app may determine a low likelihood that a long email having questions for the client to answer will be responded to base on status information which describes the client as driving a car. In an embodiment, the whisper app may indicate likelihood determinations to the client and may display alternatives to increase the likelihood of response by the client. For example, the whisper app may prompt the client to simplify existing text, change the mode of transmission (e.g., from email to SMS text message or whisper message), or change the format of the personalized message.

In determination block 1209, the whisper app may determine whether the personalized message contents contain an interrogatory. In other words, the whisper app may determine whether the client is posing a question within the personalized message contents to be answered by the client. In an embodiment, the whisper app may detect question marks text symbols or question phrasing using natural language processing. If the personalized message contents contain an interrogatory (i.e., determination block 1209="Yes"), in block 1210, the whisper app may prompt the client to enter simply response options for the interrogatory. In other words, the client may be prompted to provide responses the client can choose to answer the interrogatory. For example, if the client wants to send the client a question "What do you want for dinner?" the whisper app may prompt the client to input a set of possible responses, such as "Steak" and "Sushi."

In block 1211, the whisper app may modify the personalized message contents based on received input data from the client. In other words, the whisper app may modify the outgoing personalized message to include a set of possible client responses to the interrogatory received from the client in response to prompting. For example, the client may input text data that represents a simple response option (e.g., "yes," "no," "steak," "sushi," etc.). In an embodiment, the whisper app may also record instructions that may be executed by the venue display system 100 or personal hub if the client selects a particular simple response option. For example, the whisper app may record in a metadata instruction that if the client selects a particular response, then the venue display system 100 may transmit a particular response transmission. As further example, the metadata may direct the venue display system 100 running the whisper app to generate and transmit an SMS text message to the client's mobile device if the client's personal hub detects a particular client response. Once the response values for the interrogatory are received from the client, the whisper app may continue with the operations in determination block 1209. For example, the whisper app may determine whether another interrogatory is within the personalized message contents and thus additional response values may be received.

If the personalized message contents do not contain an interrogatory (i.e., determination block 1209="No") or if the client has provided simple response options for interrogatories within the personalized message, in block 1212 the whisper app may generate metadata that includes instructions for rendering the personalized message contents based on determined availabilities. In other words, the metadata may include instructions indicating how the venue display system 100 and connected devices may render the client's outgoing personalized message. The metadata may be code or other information that is inserted within, intermixed, and/or surrounding personalized message contents. In an embodiment, the metadata may be readable by other whisper app implementations (e.g., on the venue display system 100) and may direct a particular device to render the personalized message contents according to the client's specifications or the limitations defined by the determined availabilities. For example, metadata may indicate different simple response options related to an interrogatory and may include instructions to render each simple response option differently (e.g., one on the left, one on the right, one loud, one soft, etc.). As another example, the metadata may direct a left audio device to render a particular portion of the personalized message contents. In an embodiment, the metadata may indicate whether the client's outgoing personalized message and/or its personalized message contents should be rendered by the client's devices audibly, visually, or tactilely. For example, the metadata may direct the whisper app running on the venue display system 100 to play audio in a wireless audio device. As another example, the metadata may cause an audible beep at the client's personal hub upon receipt of a whisper personalized message, email, or an SMS personalized message. As yet another example, the metadata in the outgoing personalized message may direct the venue display system 100, personal hub, and/or other connected device to vibrate or generate other haptic feedback (e.g., a vibration motor may be activated).

In an embodiment, the generated metadata may include instructions that direct different devices connected to the venue display system 100 to render different portions of the personalized message contents. For example, the metadata may instruct a first portion to be rendered on a first device connected to the venue display system 100 and a second portion to be rendered on a second device connected to the venue display system 100. In another embodiment, the metadata may instruct a device.

In an embodiment, the generated metadata may include instructions that direct one (or more) devices connected to the venue display system 100 to render portions of the personalized message contents in different manners. For example, the metadata may instruct a wireless audio device connected to the venue display system 100 to render a first portion audibly via and may also instruct a personal hub device to render a second portion visually. The metadata may further include formatting or rendering instructions, such as whether to render personalized message contents as large text, small text, colored text, blinking text, animated text, sound, an image, and/or using information defined within a configuration file (e.g., a preferred format, etc.).

In block 1213, the whisper app may format the outgoing personalized message based on the identified message type and identified format. In an embodiment, the outgoing personalized message may also be formatted using the generated metadata. In block 1214, the client's mobile device may transmit the formatted outgoing personalized message to the client, for instance to the venue display system 100. In an embodiment, the metadata may describe the personalized message contents with a category description (e.g., question, statement, audio, whisper personalized message, etc.).

FIG. 17 illustrates an embodiment method 1300 for a venue display system 100, personal hub, and wireless audio devices receiving, rendering and responding to a personalized message formatted based on the clients status information. The mobile device may be a laptop computer, mobile device, tablet device, and other similar mobile devices. In various embodiments, any of the mobile devices, personal hub, or the wireless audio devices may perform the following operations for processing received whisper personalized messages and may each execute software capable of processing whisper personalized messages, such as a whisper app.

In block 1302, the venue display system 100 may receive an incoming personalized message from a client, for instance from a client's mobile device. For example, via mobile device 210 and venue display system 100 may receive a whisper personalized message, visual message, mobile device call, or other audio message.

In block 1304, the venue display system 100 may obtain instructions for rendering and/or delivering the received personalized message. In particular, the venue display system 100 may determine whether the received personalized message includes metadata, such as generated by whisper app or whisper software running on the client's mobile device. For example, the venue display system 100 may decode, and evaluate header information or other encoding information within the received personalized message to obtain metadata, formatting data, personalized message contents, and/or rendering instructions.

The venue display system 100 may obtain instructions (e.g., metadata) that indicate instructions for delivering personalized message contents to devices connected to the venue display system 100 (e.g., output devices such as wireless audio devices, etc.). For example, detected metadata may include instructions for the venue display system 100 to forward audio to a connected output device (e.g., the client's wireless audio device). As another example, metadata may instruct a certain portion of the personalized message contents to be performed as audio in a right wireless audio device connected to the venue display system 100 and another portion to be rendered as visual information on a connected personal hub device. The received personalized message may also contain instructions that indicate formatting instructions for various portions of the received personalized message.

For example, metadata may include instructions for the venue display system 100 to forward text-to-speech audio from one part of the received personalized message to the client's left wireless audio device and text-to-speech audio from another part of the personalized message to the right wireless audio device. As another example, metadata may indicate that certain text should be rendered in a certain color or as an animation. In an embodiment, metadata may also contain instructions directing the venue display system 100, personal hub or wireless audio devices to replay audio a certain number of times, slow down audio playbacks, increase the volume in certain sections of audio playbacks, and other effects.

In an embodiment, the received personalized message may not contain metadata. In such a case, the received personalized message may be handled by the venue display system 100 in conventional manners (e.g., leave SMS text personalized messages as unread and stored on the mobile device, send audio messages to voice mail, etc.). In an embodiment, the venue display system 100 may interpret the received personalized message's message type, and contents, and deliver the received personalized message to various output devices, such as the personal hub and wireless audio devices, for rendering without metadata. For example, the venue display system 100 may determine that a received personalized message which does not have metadata is a text personalized message from a contact on the client's privileged list and may render the personalized message as audio for playing through the wireless audio devices.

In determination block 1306, the venue display system 100 may determine whether devices are connected and/or available. In particular, the venue display system 100 may determine whether output devices indicated in obtained instructions or metadata of the received personalized message are connected to the venue display system 100 and/or available for receiving and rendering personalized message contents. For example, when metadata of the received personalized message indicates particular message contents are to be rendered as audio by a wireless audio device, the venue display system 100 may determine whether the wireless audio device is wirelessly connected (or paired) with the venue display system 100. In an embodiment, the venue display system 100, the personal hub, or any other mobile device employed by the client may detect whether output devices are connected based on operations similar to those for determining status information as described above with reference to FIG. 6. For example, the venue display system 100 may determine whether the personal hub is active and wirelessly paired such that the personal hub is available for rendering personalized message contents.

If devices are connected and/or available (i.e., determination block 1306="Yes"), in block 1307 the venue display system 100 may provide message contents to the devices for rendering. The venue display system 100 may provide, transfer, and/or otherwise deliver personalized message contents based on the obtained instructions (e.g., metadata) within the received personalized message. For example, sound or visual personalized message contents may be provided (or delivered) to a right wireless audio device for rendering based on metadata within the received personalized message. As another example, an instruction for a motor to generate a vibration may be transmitted to the personal hub. In an embodiment, the personal hub may receive the contents and instructions for delivery to wireless audio devices. The personal hub may execute obtained instructions in ways that include transferring data to wireless audio devices for playback, rendering personalized messages on the display unit of the personal hub, activating vibrations within the personal hub and/or wireless audio device devices, polling sensor units, etc. In an embodiment, the instructions may direct the personal hub to transmit the data to the audio devices at particular moments. For example, the personal hub may schedule data transmissions to the left wireless audio device before transmissions to the right audio device. In an embodiment, the venue display system 100, the personal hub, or any other mobile device utilized may provide personalized message contents to a subset of the output devices indicated in the obtained instructions or metadata based on the devices' availability (or connectivity) at the time of receipt of the received personalized message. For example, if metadata indicates personalized message contents are to be rendered by two separate wireless audio devices and only one audio device is connected to the venue display system 100, the venue display system 100 may provide contents to the one connected wireless audio device.

If the device are not connected or available (i.e., determination block 1306="No") or if personalized message contents have been provided to the devices, in optional block 855 the venue display system 100 may transmit a delivery confirmation message to the client's mobile device as described above in reference to FIG. 12.

In determination block 1310, the venue display system 100 may determine whether the received personalized message requires a response. In an embodiment, metadata may indicate a category describing the received personalized message as containing an interrogatory (or question) for the client to answer. In another embodiment, the venue display system 100 may analyze text or audio data within the received personalized message to determine whether an interrogatory is posed. For example, the venue display system 100 may execute a pattern matching routine to find well-known interrogatory patterns or symbols, such as a question mark. If the venue display system 100 determines that the received personalized message did not require a response (i.e., determination block 1310="No"), then the method 1300 may continue with the operations in block 1302.

If the venue display system 100 determines that the received personalized message did require a response (i.e., determination block 1312="Yes"), in determination block 1312, the venue display system 100 may determine whether the interrogatory requires a simple response options choice. For example, the interrogatory may include a set of simple responses the client indicated within the personalized message that the client may choose between to respond. In other words, the venue display system 100 may determine whether the personalized message contents and metadata indicate appropriate ways to present the question to the client using the personal hub and wireless audio devices. The venue display system 100 may analyze metadata within the received personalized message to detect simple response options, such as 'yes' or 'no'. For example, the metadata may contain a code or identifying information that marks the personalized message as having simple response options. In an embodiment, the venue display system 100 may analyze the text or audio of the received personalized message to determine the personalized message contains simple response options.

If the venue display system 100 determines the interrogatory requires a simple response options choice (i.e., determination block 1312="Yes"), in block 1314 the venue display system 100 may present simple response options via graphical user interface or audible indicators. In an embodiment, the venue display system 100 may transmit instructions based on metadata in the received personalized message to the various connected devices (e.g., audio device devices, personal hub, etc.) to render these simple response options to the client. Instructions for simple response options may include the personal hub displaying large text response options (e.g., 'yes'/'no', "steak"/"sushi", etc.), displaying differently colored response options, showing options as blinking or static text, playing response options in a particular wireless audio device (e.g., 'yes' audio is played in the right wireless audio device and 'no' audio is played in the left wireless audio device), and the like. In an embodiment, the metadata may direct the venue display system 100 to query client user configuration files to determine how to instruct the various devices to display or render simple response options. For example, the client may have a presets configuration file that informs the venue display system 100 to direct all 'yes' response options to the client's left wireless audio device and 'no' response options to the right audio device.

In block 1316, response input data may be received from the client. In other words, the personal hub, wireless audio devices, and other devices connected to the venue display system 100 may receive input data from the client indicating a choice of presented simple response options. Response input data may include graphical user interface input (e.g., selections on a graphical user interface button, etc.) and/or sensor data received from a sensor within a device connected to the venue display system 100 (e.g., an accelerometer, a touch sensor, a gyroscope, and/or a magnetometer within a wireless audio device, etc.). For example, the left wireless audio device may detect an abrupt motion measurement using an on-board gyroscope and wirelessly transmit this motion data to the personal hub which may in turn recognize that the client tapped the left wireless audio device to indicate selection of the response option played there. As another example, the personal hub may detect client touch input on the side of the display unit which corresponds to a response option. As another example, the client may provide different input responses by tapping on the left wireless audio device, tapping on the right wireless audio device, tapping on both wireless audio devices simultaneously, and tapping on either while tapping on the graphical user interface of the personal hub or mobile device. In an embodiment, the venue display system 100 may determine a response by the user not providing input (e.g., tapping, swiping, talking, etc.) within a certain period of time. In another embodiment, wireless audio devices, the personal hub, and/or the venue display system 100 may include microphones configured to receive audio inputs from the client. For example, when the client taps or strikes a wireless audio device that includes a microphone, that microphone may detect the sound of the tap or strike and the wireless audio device may interpret a corresponding microphone signal as an input (e.g., a tap input to select a simple option rendered through the corresponding wireless audio device, etc.).

In an embodiment, the venue display system 100 may send an audio or text message (e.g., SMS, whisper message, etc.) to the client's mobile device, execute other software, or establish a phone conversation in response to the client not selecting a simple response option. For example, if the venue display system 100 does not receive a simple response option within a certain period of time or if it detects audio input data indicating the simple response options are inadequate (e.g., the client says into the wireless audio device microphone "call him!"), the venue display system 100 may initiate a phone call or transmit a whisper message. In block 1318, if the received personalized message did not require a simple response option choice (i.e., determination block 1312="No") or the client provided input indicating a choice (or a selection) of a simple response option, the venue display system 100 may receive additional response data from the client. For example, the venue display system 100 may receive one or more of a graphical user interface or button input (e.g., typing words, numbers, etc.), speech-to-text input, and/or other information the client wants to include in a response to the client. In an embodiment, the venue display system 100 may receive audio input from the client for dictation to an email, whisper message, or SMS text message.

In the various embodiments, the mobile device, personal hub, and other connected devices may receive input data from the client in the form of movement data (e.g., tapping, striking, swiping, etc.), audio data (e.g., client verbally responds to a question), or entered text responses.

In block 1320, the venue display system 100 may generate a response message based on response data. For example, the venue display system 100 may package any received responses or input data (e.g., text message for the client, etc.) into an outgoing response message to be sent to the client's mobile device. The response message may be formatted in a similar manner as the operations described above with reference to FIG. 13. In block 1322, the venue display system 100 may transmit the response message to the client's mobile device.

In one embodiment a control apparatus collaborates with a message-passing algorithm (MPA) based decoder. FIG. 17 illustrates a decoding apparatus according to an exemplary embodiment of the present invention. The decoding apparatus 1400 includes an MPA based decoder (e.g., an LDPC decoder) 1402 and a control apparatus 1404. The MPA based decoder 1402 includes a buffer 1412, a permutation & inverse-permutation block 1414, a variable node processing block 1415, a check node message calculation block 1416, a feedback message determination block 1418, and an early-termination block 1420. Regarding the control apparatus 1404, it includes an adjusting circuit 1422 and a detecting circuit 1424, wherein the adjusting circuit 1422 includes, but is not limited to, a channel value normalization unit 1426 and an order set normalization unit 1428. As the present invention focuses on the design of the control apparatus 1404, the MPA based decoder 1402 may be realized using any conventional decoder architecture. Therefore, the exemplary decoder architecture shown in FIG. 17 is for illustrative purposes only. The operation of the functional blocks included in the MPA based decoder 1402 is briefly described as below.

The buffer 1412 is used for receiving and buffering channel values (i.e., a received codeword) CHV_IN to be decoded. The channel values are set as the initial values of the variable nodes. The permutation & inverse-permutation block 1414 controls the message passing between variable nodes and check nodes. In other words, the permutation & inverse-permutation block 1414 establishes the desired paths linked between the variable nodes and the check nodes according to the desired LDPC matrix. The variable node processing block 1415 calculates the A-Posteriori Probability (APP) values and the variable node value passed to the check node. The check node message calculation block 1416 calculates the check node messages (i.e., order sets) of each check node. Based on the actually employed algorithm, the feedback message determination block 1418 determines the feedback messages to be passed from the check nodes to the variable nodes. Similarly, the permutation & inverse-permutation block 1414 also controls the delivery of the selected feedback messages. In a next iteration, soft bits of the variable nodes (i.e., APP values) are updated by adjusting the originally received channel values buffered in the buffer 1412 according to the latest feedback messages provided by the check nodes. In each of iterations, the early-termination block 1420 calculates one syndrome according to check node values, and determines if the MPA based decoding has been converged on a correct code word.

As mentioned above, a trapping set is the set of bits that cannot be decoded to the correct values after any given number of iterations. The trapping set issue dominates LDPC error floor. To solve the trapping set issue, the adjusting circuit 1422 therefore has the channel value normalization unit 1426 inserted between the buffer 1412 and the variable node processing block 1415, and further has the order set normalization unit 1428 inserted between the feedback message determination block 1418 and the permutation & inverse-permutation block 1414. Thus, the decoding operation of one iteration is allowed to be adjusted through the adjusting circuit 1422, thereby breaking the trapping set loop to make the MPA base decoder 1402 have the chance of converging on a correct codeword as desired. In addition to the adjusting circuit 1422, the control apparatus 1404 has the detecting circuit 1424 implemented for gathering statistics data of syndromes SO obtained from executed iterations and selectively controlling the adjusting circuit 1422 to adjust a decoding operation in a next iteration to be executed according to the statistics data. In this exemplary embodiment, the detecting circuit 1424 detects the occurrence of trapping set(s) by gathering statistics data of syndromes SO obtained from executed iterations. For example, the detecting circuit 1424 updates a counter number CN by counting a number of successive times a syndrome of a current iteration is identical to a syndrome of a previous iteration, and the detecting circuit 1424 refers to the counter number CN for selectively controlling the adjusting circuit 1422 to adjust the decoding operation in the next iteration to be executed. Therefore, when the syndrome of the current iteration is different from the syndrome of the previous iteration, the detecting circuit resets the counter number CN to an initial value (e.g., 0), and when the syndrome of the current iteration is identical to the syndrome of the previous iteration, the detecting circuit 1424 adds an adjustment value (e.g., 1) to the counter number CN. To identify the occurrence of trapping set(s), the detecting circuit 1424 checks if the counter number CN reaches a target value (e.g., 1, 2, or 3). When the counter number CN reaches the target value, the detecting circuit 1424 controls the adjusting circuit 1422 to adjust the decoding operation in the next iteration to be executed, and resets the counter number CN to the initial value.

As mentioned above, the adjusting circuit 1422 includes the channel value normalization unit 1426 and the order set normalization unit 1428. Therefore, when the detecting circuit 1424 determines that bits of the variable nodes include trapping set(s) by referring to the statistic data (e.g., the counter number CN of successive iterations having the same syndrome), the detecting circuit 1424 generates an enable signal S_EN to control the order set normalization unit 1428 and a normalization index signal S_IOX to control the channel value normalization unit 1426. When notified by the enable signal S_EN, the order set normalization unit 1428 is enabled to adjust all order sets of the check nodes. Then, the adjusted order sets are passed to the variable node processing block 1415 for calculating the APP value through the message path determined by the permutation & inverse-permutation block 1414. Similarly, when notified by the normalization index signal S_IOX, the channel value normalization unit 1426 is operative to adjust all channel values (i.e., received bits) read from the buffer 1412. Then, the adjusted channel values are passed to the variable node processing block 1415 for calculating the APP value. Please note that the original channel values stored in the buffer 1412 remain intact. To put it another way, the adjusting circuit 1422 may adjust the decoding operation in the next iteration to be executed by adjusting all channel values and all order sets. For example, the order set normalization unit 1428 may be configured to reduce all order sets (e.g. reduce the value of all check node messages) by perform a bit-shifting operation upon each order set, and the channel value normalization unit 1426 may be configured to reduce all channel values by performing a bit-shifting operation upon each channel value. Please note that the order set normalization unit 1428 may also be configured to reduce the value of at least part of the check node messages (e.g., reduce the value of 2000 check node messages of all 2048 check node messages), and the channel value normalization unit 1426 may be configured to reduce at least part of the channel values (e.g., reduce the value of 1000 channel values of all 1024 channel values).

Figure 18:
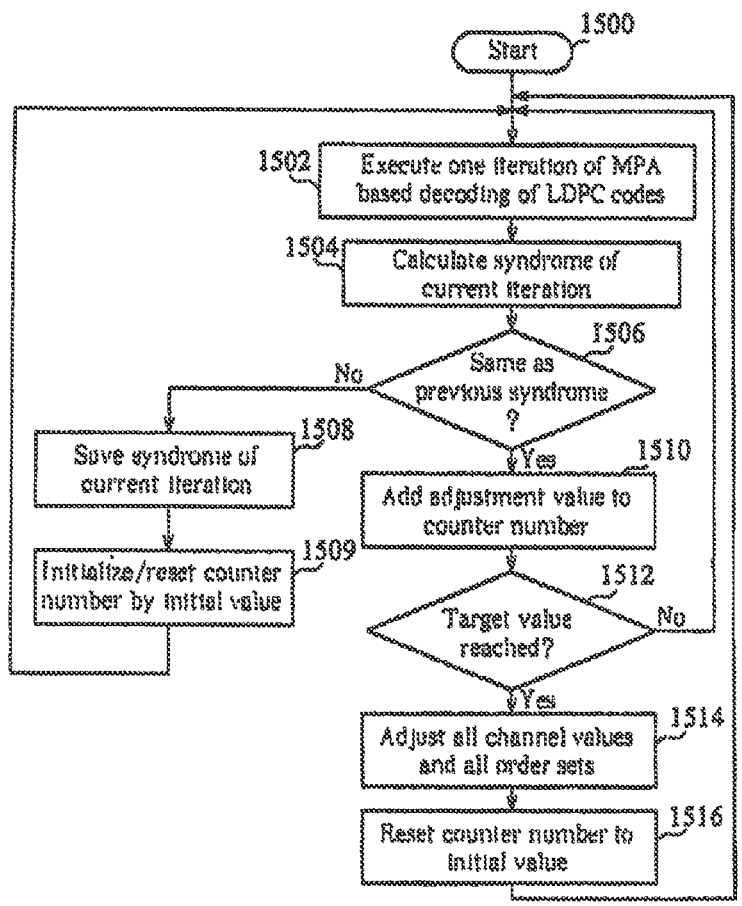
FIG. 18 is a flowchart of a method for controlling a message-passing algorithm based decoding operation according to an exemplary embodiment of the present invention.

FIG. 18 is a flowchart of a method for controlling a message-passing algorithm (MPA) based decoding operation according to an exemplary embodiment of the present invention. If the result is substantially the same, the steps are not required to be executed in the exact order shown in FIG. 18. The method may be employed by the decoding apparatus 1400 shown in FIG. 17, and may be briefly summarized as follows.

Step 1500: Start.

Step 1502: Execute one iteration of the MPA based decoding of LDPC codes.

Step 1504: Calculate a syndrome of a current iteration.

Step 1506: Check if the syndrome of the current iteration is the same as a syndrome of a previous iteration. If yes, go to step 1510; otherwise, go to step 1508.

Step 1508: Save the syndrome of the current iteration.

Step 1509: Initialize/reset a counter number by an initial value (e.g., 0). Go to step 1502.

Step 1510: Add an adjustment value (e.g., 1) to the counter number.

Step 1512: Check if the counter number reaches a target value (e.g., 3). If yes, go to step 1514; otherwise, go to step 1502.

Step 1514: Adjust all channel values and all order sets (e.g., perform a bit-shifting operation upon each channel value and each order set to thereby reduce all channel values and all order sets).

Step 1516: Reset the counter number to the initial value. Go to step 1502.

In step 1508, the syndrome of the current iteration is saved to be compared with a syndrome of a next iteration of the MPA based decoding of LDPC codes. That is, when the next iteration is started in step 1502, the syndrome of the current iteration obtained in the previously executed step 1508 would act as the syndrome of the previous iteration needed in the following step 1506. It should be noted that the aforementioned initial value, the adjustment value, and/or the target value may be adjusted, depending upon actual design requirement/consideration.

Step 1512 detects that the counter number reaches the target value. Therefore, step 1516 is executed to reset the counter number to the initial value for the next iteration (i.e., the 9th iteration). Moreover, as step 1506 finds that the calculated syndrome (i.e., the syndrome of the current iteration) and the saved syndrome (i.e., the syndrome of the previous iteration) are different in the 1st iteration, the 2nd iteration and 5th iteration, the saved syndrome is updated/replaced by the calculated syndrome.

Figure 20:
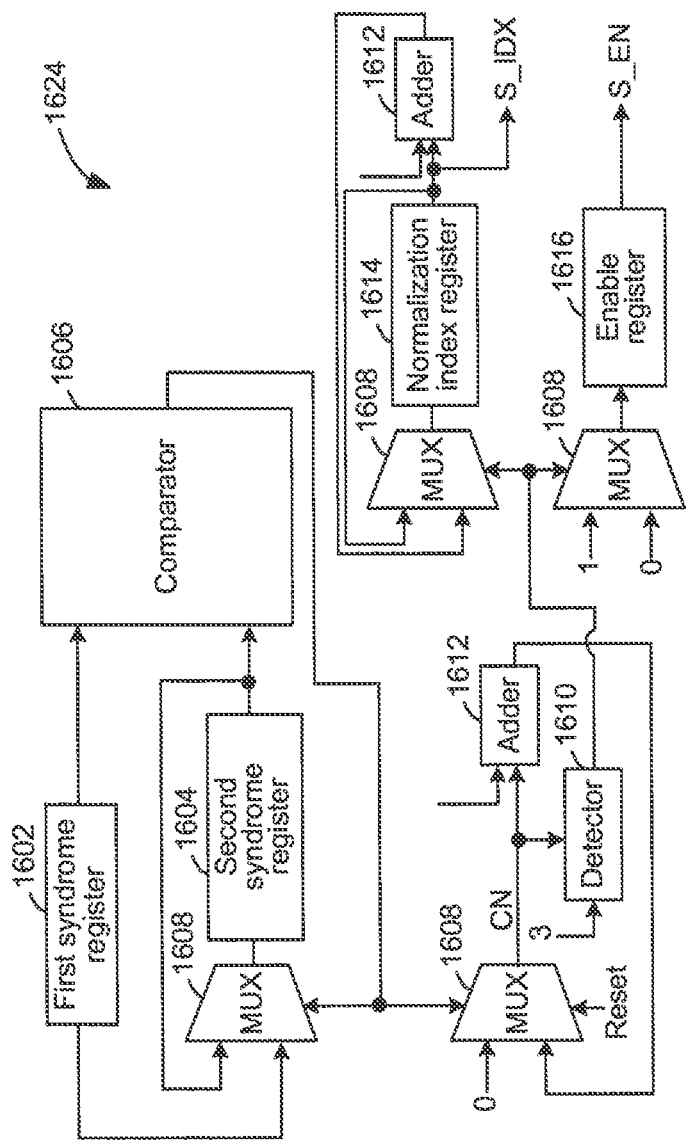
FIG. 20 is a diagram illustrating an exemplary implementation of a detecting circuit shown in FIG. 17.

FIG. 20 illustrates an exemplary implementation of the detecting circuit 1424 shown in FIG. 17. The detecting circuit 1424 includes, but is not limited to, a first syndrome register 1602, a second syndrome register 1604, a comparator 1606, a plurality of multiplexers 1608_1, 1608_2, 1608_3, a detector 1610, a plurality of adders 1612_1, 1612_2, a normalization index register 1614, and an enable register 1616. The first syndrome register 1602 is used for storing a syndrome of a current iteration (i.e., the calculated syndrome mentioned above), and the second syndrome register 1604 is used for storing a syndrome of a previous iteration (i.e., the saved syndrome mentioned above). The comparator 1606 compares the syndromes stored in the first syndrome register 1602 and the second register 1604 to determine if two successive iterations have the same syndrome. When the comparison result indicates that the syndrome stored in the first syndrome register 1602 is identical to the syndrome stored in the second syndrome register 1604, the multiplexer 1608_1 selects the syndrome stored in the second syndrome register 1604 as its output for keeping the syndrome stored in the second syndrome register 1604 unchanged; otherwise, the multiplexer 1608_1 selects the syndrome stored in the first syndrome register 1602 as its output for updating the syndrome stored in the second syndrome register 1604 by the syndrome stored in the first syndrome register 1602.

In addition, when the comparison result indicates that the syndrome stored in the first syndrome register 1602 is identical to the syndrome stored in the second syndrome register 1604, the multiplexer 1608_2 selects an initial value (e.g., 0) as its output for making the counter number CN equal to the initial value; otherwise, the multiplexer 1608_2 selects an output of the adder 1612_1 as its output, wherein the adder 1612_1 is implemented to add an adjustment value (e.g., 1) to the counter number CN.

When the detector 1610 finds that the counter number CN does not reach a target value (e.g., 3) yet, the multiplexer 1608_3 selects a normalization index stored in the normalization index register 1614 as its output, wherein an initial value of the normalization index may be 0; otherwise, the multiplexer 1608_3 selects an output of the adder 1612_2 as its output for updating the normalization index stored in the normalization index register 1614, wherein the adder 1612_2 is implemented to add an adjustment value (e.g., 1) to the normalization index read from the normalization index register 1614. It should be noted that an output of the normalization index register 1614 also serves as the aforementioned normalization index signal S_IDX sent to the channel value normalization unit 1426. Therefore, in this exemplary embodiment, the normalization index stored in the normalization index register 1614 determines the number of bits to be shifted during the bit-shifting operation performed by the channel value normalization unit 1426. In other words, the normalization index determines the adjusting degree of the channel value adjustment. Please note that the channel value normalization unit 1426 can also achieve the channel value adjustment by any means other than the bit-shifting operation. In addition, the normalization index stored in the normalization index register 1614 can be reset while the decoding process is done (no matter success or fail).

Besides, when the detector 1610 finds that the counter number CN does not reach the target value (e.g., 3) yet, the multiplexer 1608_4 selects a first logic value "0" as its output; otherwise, the multiplexer 1608_4 selects a second logic value "1" as its output. It should be noted that an output of the enable register 1616 acts as the aforementioned enable signal S_EN sent to the order set normalization unit 1428. More specifically, when the multiplexer 1608_4 selects the first logic value "0" as its output, the enable signal S_EN is deasserted; however, when the multiplexer 1608_4 selects the second logic value "1" as its output, the enable signal S_EN is asserted to thereby activate the order set normalization unit 1428 for applying a scaling factor (e.g., 0.5) to all order sets. Please note that the scaling factor can be configured as required at any time.

It should be noted that the counter number CN would be reset to the initial value after the enable signal S_EN and the normalization index signal S_IDX respectively triggers the order set normalization unit 1428 and the channel value normalization unit 1426. Thus, due to the counter number CN with the initial value smaller than the target value, the detector 1610 controls the multiplexers 1608_3 and 1608_4, such that the multiplexer 1608_4 selects the first logic value "0" as its output and the multiplexer 1608_3 selects the current normalization index stored in the normalization index register 1614 as its output. However, the normalization index stored in the normalization index register 1614 will be increased by 1 again to further reduce the channel values read from the buffer 1412 and the enable signal S_EN will be asserted again to further reduce the order sets generated from the check node message calculation block 1416 when the trapping set loop is not successfully broken due to previous adjustment made to the channel values and the order sets.

Please note that adjusting the channel values and the order sets has equivalent effect as adjusting the A-Posteriori Probability (APP) values at the variable nodes. Since the APP values (and/or the variable node values passed to the check nodes) are calculated from the channel values and corresponding order sets (e.g. summing the channel values with corresponding order sets). People skilled in the art can readily understand that adjusting the APP values (or the variable node values passed to the check nodes), no matter adjusting the channel values and/or the order sets or not, may have chance to solve the trapping set issue. In other words, the proposed adjusting circuit 1422 may have ability to adjust the APP values (or the variable node values passed to the check nodes) or may adjust the APP values (or the variable node values passed to the check nodes) in place of adjusting the channel values and/or order sets, which also falls into the scope of the present invention. The decoding operation of the next iteration is properly adjusted by means of the proposed adjusting circuit 1422 having the channel value normalization unit 1426 and the order set normalization unit 1428 included therein. As all of the errors trapped in the variable nodes may be identified and corrected in the following one or more iterations through adjusting the channel values and the order sets, the LDPC error floor is lowered effectively.

In above exemplary embodiment, the channel value and the order set are both adjusted in response to the trapping set detection performed by the detecting circuit 1424. However, this is for illustrative purposes only, and is not meant to be a limitation of the present invention. In one alternative design, the channel value normalization unit 1426 shown in FIG. 17 may be omitted, thereby leaving the order set normalization unit 1428 in the modified adjusting circuit. In another alternative design, the order set normalization unit 1428 shown in FIG. 17 may be omitted, thereby leaving the channel value normalization unit 1426 in the modified adjusting circuit. The same objective of breaking the trapping set loop and lowing the LDPC error floor may be achieved. To put it simply, no matter how the adjusting circuit is configured, the spirit of the present invention is obeyed as long as the decoding operation in the next iteration to be executed is adjusted when a detection operation identifies the occurrence of trapping set(s).

Moreover, the control apparatus 1404 is capable of collaborating with any MPA based decoder, such as an offset min-sum algorithm (OMSA) decoder or a normalized min-sum algorithm (NMSA) decoder.

You Active.

In one embodiment venue display system 100 includes, server 110 that communicates with a box and includes processor 165. Content server 110 is part of SMS 150. The system 100 also includes venue display management system 150, digital projector 120, and storage device 130. In one embodiment the system 110 provides a timeline of media content to be triggered.

In one embodiment of the present invention venue display system provides for selected localization to a client. Server includes processor. The server is configured to provide for selected localization of content from one or more of: a venue display, a 0-Cinema or alternative content, and at a selected localization. A content server is part of (SMS). A venue display management system is utilized for the display of content. Venue display system includes a storage device for storing content.

As a non-limiting example, the content is selected from at least one of, a video, movie, media from a display venue, and media from any public place where a movie or video is provided.

As a non-limiting example the location is selected from at least one of, residences, dwellings including commercial office space, warehouses, general building structures, marine vessels and aircraft.

In one embodiment the selected location utilizes a private or public 0-Cinema setup. In one embodiment the 0-Cinema setup is based on at least one of: (i) 0-Cinema server; (ii) a 0-Cinema projector; and (iii) one or more 0-Cinema peripherals.

In one embodiment the 0-Cinema server is modified inside a security server manager. As a non-limiting example, the security server manager is a zone that is FIPS 140-2 Level 3 Certified. As a non-limiting example the modifications are selected from at least one of: (i) addition of a GPS receiver in the server security manager; (ii) addition of a playback authorization license file into the server security manager; and (iii) addition of a secured operating workflow. In one embodiment a 0-Cinema screen setup is modified to record a setup "GPS location" inside the server security manager. In one embodiment a link is enabled to a NOC supervision center which in return sends a valid authorization license file to the server security manager.

In one embodiment the link is valid only for a recorded selected location. In one embodiment at a usage time at the selected localization a 0-Cinema setup video playback is authorized. In one embodiment a first GPS receiver is at the server security manager and a second GPS receiver is coupled to a frame screen. In one embodiment a playback authorization license file is at the server security manager. In one embodiment selected localization of a video, movie and the like is provided from a display venue, any public place with a movie or video is provided, and the like, for residences, dwellings, including but not limited to commercial office space, warehouses, general building structures, marine vessels and aircraft. In one embodiment the active localization of is of a movie, movie media and the location is provided to a non-display venue using private 0-Cinema.

In one embodiment the 0-Cinema setup involved is based on: (i) 0-Cinema server 140 per OCI specifications; (ii) 0-Cinema projector 138 per OCI specifications; and (iii) 0-Cinema peripherals.

In one embodiment the 0-Cinema server 140 is modified inside its regular "Security Manager" zone which is a device FIPS 140-2 Level 3 Certified. http://www.dcimovies.com/FIPS/nov-11-2010-FIPS_NIST_IB.html)

As a non-limiting example the modifications can include: (i) the addition of a GPS receiver in the server security manager; (ii) addition of a playback authorization license file into the server Security Manager; and (iii) the addition of a secured operating workflow.

As a non-limiting example when an installer completes the initial private 0-Cinema screen setup a technician records the setup "GPS location" inside the server Security Manager. A link is then enabled to a NOC supervision center which in return sends a valid authorization license file to the server Security Manager. This is only valid for the recorded setup location. At usage time of the 0-Cinema setup video playback is authorized In one embodiment two additional GPS receivers are installed. The first one is at the server Security Manager. The second one is coupled to the frame screen. A playback authorization license file is added to the server Security Manager, as is a secured operating workflow.

In one embodiment this process is FIPS secured with the FIPS secured area of the server Security Manager. As a non-limiting example The 0-Cinema server 140 is modified inside its regular Security Manager zone which is a device FIPS 140-2 Level 3 Certified. (http://www.dcimovies.com/FIPS/nov-11-201 0-FIPS_NIST_IB.html) In one embodiment this process is FIPS secured as it is embedded into the FIPS secured area of the server Security Manager.

As a non-limiting example, when the installer completes the initial private 0-Cinema screen setup, the technician records the setup dual "GPS locations" inside the server Security Manager. The difference in location between server and screen, which as a non-limiting example can be a few meters, is stored. A link is then enabled to a NOC supervision center which in return sends a valid authorization license file to the server Security Manager which is only valid for the recorded setup location difference. At usage time of 0-Cinema setup the video playback is authorized.

In one embodiment if at a later point in time the embedded GPS device detects a change in location from the initial recorded location by more than few meters the playback authorization license file become invalid.

In one embodiment if later on, the embedded GPS devices detect a change in location difference from the initial recorded location difference by more than few meters, then the playback authorization license file become invalid and blocks the playback and the supervision NOC is alerted.

In one embodiment an alert allows an NOC technician to call the client, check for what is going on. In one embodiment this triggers the installer visit on client field to reset the playback authorization like done at the initial setup and re-enable playback capability after recording a new GPS location and generating a new playback authorization license file.

The installer visit at the client field resets the playback authorization as with the initial set-up, but with a new GPS location. This produces a new playback authorization license file.

In one embodiment if an aircraft is in motion, active localization can still be provided.

CLOUD INFRASTRUCTURE

In one embodiment a cloud can be utilized that includes web applications, mobile devices, personal computer and/or laptops and social networks, such as, Twitter®. ("Twitter®" is a trademark of Twitter Inc.). It will be appreciated that other social networks can be included in the cloud services and Twitter® has been given as a specific example. Therefore, every component forms part of the cloud services which comprises servers, applications and clients as defined above.

The cloud services based system facilitates adjusting utilization and/or allocation of hardware resource(s) to remote clients. The system includes a third party service provider, that is provided by the methods used with the present invention, that can concurrently service requests from several clients without lottery participant perception of degraded computing performance as compared to conventional techniques where computational tasks can be performed upon a client or a server within a proprietary intranet. The third party service provider (e.g., "cloud services") supports a collection of hardware and/or software resources. The hardware and/or software resources can be maintained by an off-premises party, and the resources can be accessed and utilized by identified lottery participants over Network Systems 110. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

In one embodiment the cloud is used for the remote door 12 status operation, remote door operation for locking, unlocking and the like.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a lottery participant can employ, concurrently, at different times, and the like, all or a subset of the third party service providers.

By leveraging resources supported by the third party service provider, limitations commonly encountered with respect to hardware associated with clients and servers within proprietary intranets can be mitigated. Off-premises parties, can maintain, troubleshoot, replace and update the hardware resources. Further, for example, lengthy downtimes can be mitigated by the third party service provider utilizing redundant resources; thus, if a subset of the resources are being update or replaced, the remainder of the resources can be utilized to service requests from lottery participants. According to this example, the resources can be modular in nature, and thus, resources can be added, removed, tested, modified, etc. while the remainder of the resources can support servicing lottery participant requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

The system can include a client device, which can be the wearable device and/or mobile device that employs resources of the third party service provider. Although one client device is depicted, it is to be appreciated that the system can include any number of client devices similar to the client device, and the plurality of client devices can concurrently utilize supported resources. By way of illustration, the client device can be a desktop device (e.g., personal computer), mobile device, and the like. Further, the client device can be an embedded system that can be physically limited, and hence, it can be beneficial to leverage resources of the third party service provider.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the lottery participant of the client device. In accordance with another example, the resources can include data store(s) that can be employed by the client device to retain data. The lottery participant employing the client device can have access to a portion of the data store(s) supported by the third party service provider, while access can be denied to remaining portions of the data store(s) (e.g., the data store(s) can selectively mask memory based upon lottery participant/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a lottery participant interface, and the like via employing one or more resources. Further, the interface component can obtain and/or transmit data over a Network Systems 110 connection. According to an illustration, executable code can be received and/or sent by the interface component over the Network System 100 connection. Pursuant to another example, a lottery participant (e.g. employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

In one embodiment a system includes the third party service provider that supports any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between lottery participants, devices, computational tasks, and the like. Moreover, the dynamic allocation component can further include a lottery participant state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the mobile device may be unable to display a rich graphical user interface.

Moreover, the enhancement component can facilitate increasing an allocation of resources for a particular lottery participant and/or client device.

In one embodiment a system employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

In one embodiment a system archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g. by the client device) to organize, annotate, and otherwise reference content without making it local to the client device. Pursuant to an illustration, enormous video files can be tagged via utilizing a mobile device. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate lottery participants and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on lottery participant identity and/or authorization level. For instance, the security component can encrypt data transferred to the client device and/or decrypt data obtained from the client device. Moreover, the security component can certify and/or authenticate data retained by the archive component.

The permission component can enable a lottery participant to assign arbitrary access permissions to various lottery participants, groups of lottery participants and/or all lottery participants.

Further, the aggregation component assembles and/or analyzes collections of data. The aggregation component can seamlessly incorporate third party data into a particular lottery participant's data.

The restoration component rolls back data retained by the archive component. For example, the restoration component can continuously record an environment associated with the third party service provider. Further, the restoration component can playback the recording.

Mobile Device

A mobile or computing device can include an app for executing the methods of the present invention.

The mobile or computing device can include a display that can be a touch sensitive display. The touch-sensitive display is sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (110) subsystem, other input or control devices, and an external port. The mobile or computing device may include one or more optical sensors. These components may communicate over one or more communication buses or signal lines.

It should be appreciated that the mobile or computing device is only one example of a portable multifunction mobile or computing device, and that the mobile or computing device may have more or fewer components than shown, may combine two or more components, or a may have a different configuration or arrangement of the components. The various components may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications with communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with Network Systems 110 and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (COMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoiP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack. The headset jack provides an interface between the audio circuitry and removable audio input/output peripherals, such as output-only headphones or a headset with both output (e.g., a headphone for one or both ears) and input (e.g., a microphone).

The 1/0 subsystem couples input/output peripherals on the mobile or computing device, such as the touch screen and other input/control devices, to the peripherals interface. The 1/0 subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage at the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof {collectively termed "graphics"). In some embodiments, some or all of the visual output may correspond to user interface objects, further details which are described below.

A touch screen has a touch-sensitive surface, sensor or set of sensors that accepts input from the user based on haptic and/or tactile contact The touch screen and the display controller {along with any associated modules and/or sets of instructions in memory) detect contact {and any movement or breaking of H1e contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user"

The touch screen may use LCD {liquid crystal display) technology, or LPD (light emitting polymer display) technology, although other display technologies may be used in other embodiments. The touch screen and Hm display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi touch sensitive tablets described in the following U.S. Pat. No. 6,323,846 (Westerman et al), U.S. Pat. No. 6,570,557 {Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005: (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005: (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, tile touch screen has a resolution of approximately 1060 dpL The user may make contact with the touch screen using any suitable object or appendage, such as a stylus, a finger, and so forth. In some embodiments, the user interface is designed to work primarily with finger-based contacts and mood intensity, which are much less precise than stylus-based input due to the larger area of contact of a finger on the touch screen. In some embodiments, the device translates the rough finger-based input into a precise pointer/cursor position or command for performing the actions desired by tile user.

In some embodiments, in addition to the touch screen, the mobile or computing device may include a touchpad (not shown) for activating or deactivating particular functions. In some embodiments, the touchpad is a touch-sensitive area of tile device that, unlike the touch screen, does not display visual output. The touchpad may be a touch-sensitive surface that is separate from the touch screen or an extension of the touch sensitive surface formed by the touch screen.

In some embodiments, tile mobile or computing device may include a physical or virtual click wheel as an input control device. A user may navigate among and interact with one or more graphical objects {henceforth referred to as icons) displayed in the touch screen by rotating the click wheel or by moving a point of contact with the click wheel {e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with tile device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including not limited to optical sensors. In one embodiment an optical sensor is coupled to an optical sensor controller in 1/0 subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector in Handheld Device," filed Sep. 30, 2005; Ser. No. 11/240,788, "Proximity Detector in Handheld Device," filed Sep. 30, 2005; Ser. No. 13/096,386, "Using Ambient Light Sensor to Augment Proximity Sensor Output"; Ser. No. 13/096,386, "Automated Response to And Sensing of User Activity in Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network Systems 110. In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating mobile device number(s), e-mail address(es), physical address(es) or other information with a name; associating an image with a name; categorizing and sorting names; providing mobile device numbers or e-mail addresses to initiate and/or facilitate communications by mobile device, video conference, e-mail, or IM; and so forth.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A method of providing localization of content to a client, comprising:
    accessing, by the client, content from a video, movie, media from a display venue, and media from any public place where a movie or video is provided utilizing a private or public 0-Cinema setup; wherein the 0-Cinema setup is (i) a 0-Cinema server; (ii) a 0-Cinema projector; and (iii) one or more 0-Cinema peripherals;
    modifying the 0-Cinema server inside a security server manager by (i) adding of a GPS receiver, (ii) adding a playback authorization license file into the security manager; and (iii) adding a secured operating workflow; wherein the adding of the playback authorization license file into the security manager comprises enabling a link to a supervision center; returning, by the supervision center, a valid authorization license file to the security server manager, wherein the valid authorization license is only valid for a recorded setup location selected by the client;
    controlling by the 0-Cinema server playback of the content at the client selected location at a specific time in response to the valid authorization;
    detecting by the GPS receiver a change in location difference from the client selected location to a new location; invalidating the authorization license file, blocking the playback, and alerting the supervision center in response to the detecting; and
    checking by a technician of the supervision center with the client on a reason for location change;
    generating a new playback authorization license file and recording of a new GPS location of the client in response to authorization by the technician; and
    restarting the playback.

2. The method of claim 1, wherein the location is selected from at least one of, residences, dwellings including commercial office space, warehouses, general building structures, marine vessels and aircraft.

3. The method of claim 1, wherein the security manager server that is FIPS 140-2 Level 3 certified.

4. The method of claim 1, further comprising: validating the link for the recorded selected location.

* * * * *